(12) United States Patent
Zayas et al.

(10) Patent No.: US 9,043,291 B2
(45) Date of Patent: *May 26, 2015

(54) SYSTEM AND METHOD FOR VERIFYING AND RESTORING THE CONSISTENCY OF INODE TO PATHNAME MAPPINGS IN A FILESYSTEM

(75) Inventors: Edward R. Zayas, Milpitas, CA (US); Thomas Haynes, Tulsa, OK (US); John Francis Gillono, North Chelmsford, MA (US); Andy C. Kahn, San Francisco, CA (US)

(73) Assignee: NetApp, Inc., Sunnyvale, CA (US)

( * ) Notice: Subject to any disclaimer, the term of this patent is extended or adjusted under 35 U.S.C. 154(b) by 366 days.

This patent is subject to a terminal disclaimer.

(21) Appl. No.: 12/695,184

(22) Filed: Jan. 28, 2010

(65) Prior Publication Data

US 2010/0131474 A1 May 27, 2010

Related U.S. Application Data

(63) Continuation of application No. 11/233,441, filed on Sep. 22, 2005, now Pat. No. 7,707,193.

(51) Int. Cl.
 *G06F 17/30* (2006.01)
(52) U.S. Cl.
 CPC .................. *G06F 17/30067* (2013.01)
(58) Field of Classification Search
 USPC ......... 707/713, 736, 706, 718, 758, 610, 661, 707/999.1; 709/219, 226, 238; 711/111, 711/112, 113
 See application file for complete search history.

(56) References Cited

U.S. PATENT DOCUMENTS

| | | | |
|---|---|---|---|
| 4,570,217 A | 2/1986 | Allen et al. | |
| 5,163,131 A | 11/1992 | Row et al. | |
| 5,202,979 A | 4/1993 | Hillis et al. | |
| 5,278,979 A | 1/1994 | Foster et al. | |
| 5,742,817 A | 4/1998 | Pinkoski | |
| 5,819,292 A | 10/1998 | Hitz et al. | |
| 6,192,408 B1 | 2/2001 | Vahalia et al. | |
| 6,230,200 B1 | 5/2001 | Forecast et al. | |
| 6,560,615 B1 | 5/2003 | Zayas et al. | |
| 6,671,773 B2 | 12/2003 | Kazar et al. | |
| 6,895,413 B2 | 5/2005 | Edwards | |
| 7,099,866 B1 | 8/2006 | Crosbie et al. | |
| 7,103,616 B1 * | 9/2006 | Harmer et al. | ......................... 1/1 |
| 7,313,720 B1 | 12/2007 | Eng et al. | |
| 7,386,546 B1 | 6/2008 | Santry et al. | |
| 2002/0083037 A1 | 6/2002 | Lewis et al. | |
| 2003/0182322 A1 * | 9/2003 | Manley et al. | ................ 707/201 |

(Continued)

OTHER PUBLICATIONS

Akyurek, Sedat, Placing Replicated Data to Reduce Seek Delays, Department of Computer Science, University of Maryland, UMIACS-TR-91-121, CS-TR-2746, Aug. 1991.

(Continued)

*Primary Examiner* — Syling Yen
(74) *Attorney, Agent, or Firm* — Cesari and McKenna, LLP

(57) ABSTRACT

A system and method verifies and restores the consistency of inode to pathname mappings. In a first embodiment, an off-line verification procedure is modified to verify and correct the primary name inode to pathname mapping information within inodes of a file system. In a second embodiment, an on-line file system verification process is modified to verify inode to pathname mapping information upon the loading of each inode within the file system.

19 Claims, 15 Drawing Sheets

(56) References Cited

U.S. PATENT DOCUMENTS

| | | | |
|---|---|---|---|
| 2003/0182389 A1* | 9/2003 | Edwards | 709/213 |
| 2004/0030668 A1 | 2/2004 | Pawlowski et al. | |
| 2004/0054748 A1 | 3/2004 | Ackaouy et al. | |
| 2005/0015354 A1* | 1/2005 | Grubbs et al. | 707/1 |
| 2005/0246401 A1 | 11/2005 | Edwards et al. | |
| 2005/0246612 A1 | 11/2005 | Leis et al. | |
| 2006/0059204 A1* | 3/2006 | Borthakur et al. | 707/200 |
| 2006/0277221 A1 | 12/2006 | Zavisca et al. | |
| 2006/0288026 A1 | 12/2006 | Zayas et al. | |

OTHER PUBLICATIONS

Bitton, Dina, Disk Shadowing, Proceedings of the 14th VLDB Conference, LA, CA 1988.

Chaudhuri, Surajit, et al., Self-Tuning Technology in Microsoft SQL Server, Data Engineering Journal 22, 2 1999 pp. 20-27.

Chutani, Sailesh, et al., The Episode File System, In Proceedings of the USENIX Winter 1992.

Coyne, Robert A., et al., Storage Systems for National Information Assets, Proc. Supercomputing 92, Minneapolis, Nov. 1992, pp. 626-633.

Finlayson, Ross S., et al., Log Files: An Extended File Service Exploiting Write-Once Storage Department of Computer Science, Stanford University, Report No. STAN-CS-87-1177, Sep. 1987.

Gray, Jim, et al., The Recovery Manager of the System R Database Manager, ACM Computing Surveys, (13)2:223-242 1981.

Hecht, Matthew S., et al. Shadowed Management of Free Disk Pages with a Linked List, ACM Transactions on Database Systems, 8/4, Dec. 1983, pp. 503-514.

Howard, John, H. et al., Scale and Performance in a Distributed File System, Carnegie Mellon University, CMU-ITC-87-068, Aug. 1987.

Howard, John H., An Overview of the Andrew File System, Carnegie Mellon University, CMU-ITC-88-062 1988.

Howard, John, H. et al., Scale and Performance in a Distributed File System, ACM Trans. Computer System, 6(1), Feb. 1988 pp. 51-81.

Kazar, Michael L., et al., DEcorum File System Architectural Overview, USENIX Summer Conference, Anaheim, California, 1990.

Kemper, Alfons, et al., Performance Tuning for SAP R/3, Data Engineering Journal 22, 2 1999 pp. 33-40.

Kent, Jack et al., Optimizing Shadow Recovery Algorithms, IEEE Transactions on Software Engineering, 14(2): 155-168, Feb. 1988.

Kistler, et al., Disconnected Operation in the Coda File System, ACM Transactions on Computer Systems, vol. 10, No. 1, Feb. 1992, pp. 3-25.

Lorie, Raymond, A. Physical Integrity in a Large Segmented Database, ACM Trans. Database Syst., vol. 2, Mar. 1977, pp. 91-104.

Ousterhout, John et al., Beating the I/O Bottleneck: A Case for Log-Structured File Systems, Technical Report, Computer Science Division, Electrical Engineering and Copmuter Sciences, University of California at Berkeley, Oct. 30, 1988.

Patterson, D., et al., A Case for Redundant Arrays of Inexpensive Disks (RAID), Technical Report, CSD-87-391, Computer Science Division, Electrical Engineering and Computer Sciences, University of California at Berkeley 1987.

Patterson, D., et al., A Case for Redundant Arrays of Inexpensive Disks (RAID), SIGMOD International Conference on Management of Data, Chicago, IL, USA, Jun. 1-3, 1988, SIGMOD Record (17)3:109-16 Sep. 1988.

Peterson, Zachary Nathaniel Joseph, Data Placement for Copy-on-Write Using Virtual Contiguity, University of CA, Santa Cruz, Master's Thesis for the Department of Science in Computer Science, Sep. 2002.

Quinlan, Sean, A Cached WORM File System, Software-Practice and Experience, 21(12):1289-1299 1991.

Rosenblum, Mendel, et al., The LFS Storage Manager, Computer Science Division, Electrical Engineering And Computer Sciences, Univ. of CA, presented at Summer '90 USENIX Technical Conference, Anaheim, CA Jun. 1990.

Rosenblum, Mendel, et al. The Design and Implementation of a Log-Structured File System Jul. 24, 1991 pp. 1-15.

Rosenblum, Mendel, The Design and Implementation of a Log-Structured File System, 1992 pp. 1-93.

Rosenblum, Mendel, et al., The Design and Implementation of a Log-Structured File System, In Proceedings of ACM Transactions on Computer Systems, (10)1:26-52, Feb. 1992.

Schiefer, Berni, et al., DB2 Universal Database Performance Tuning, Data Engineering Journal 22, 2 1999 pp. 12-19.

Seltzer, Margo I., et al., Journaling Versus Soft Updates: Asynchronous Meta-Data Protection in File Systems, Proceedings of 200 USENIX Annual Technical Conference, Jun. 18-23, 2000.

Shasha, Dennis, Tuning Time Series Queries in Finance: Case Studies and Recommendations, Data Engineering Journal 22, 2 1999 pp. 41-47.

Sidebotham, Bob, Volumes: The Andrew File System Data Structuring Primitive, EEUG Conference Proceedings, Manchester, UK, Autumn 1986.

Subramanian, Muralidhar, et al., Performance Challenges in Object-Relational DBMSs, Data Engineering Journal 22, 2 1999 pp. 28-32.

Weikum, Gerhard, et al., Towards Self-Tuning Memory Management for Data Servers, Data Engineering Journal 22, 2 1999 pp. 3-11.

West, Michael, et al. The ITC Distributed File System: Prototype and Experience, Carnegie-Mellon University, Technical Report CMU-ITC-040, Mar. 1985.

Zayas, Edward R., AFS-3 Programmer's Reference: Architectural Overview, Transarc Corporation, Pittsburgh, PA, 1.0 edition 1991.

* cited by examiner

SYSTEM AND METHOD FOR VERIFYING AND RESTORING THE CONSISTENCY OF INODE TO PATHNAME MAPPINGS IN A FILESYSTEM

RELATED APPLICATION

This application is a continuation of U.S. patent application Ser. No. 11/233,441 filed on Sep. 22, 2005, by Edward R. Zayas et al., entitled SYSTEM AND METHOD FOR VERIFYING AND RESTORING THE CONSISTENCY OF INODE TO PATHNAME MAPPINGS IN A FILESYSTEM, now issued as U.S. Pat. No. 7,707,193 on Apr. 27, 2010, the teachings of which are expressly incorporated herein by reference, which is related to the following:

U.S. patent application Ser. No. 11/156,679, entitled SYSTEM AND METHOD FOR MAINTAINING MAPPINGS FROM DATA CONTAINERS TO THEIR PARENT DIRECTORIES, by Edward Zayas, et al., now issued as U.S. Pat. No. 7,739,318 on Jun. 5, 2010, the teachings of which are expressly incorporated herein by reference; and U.S. Pat. No. 6,895,413, entitled SYSTEM AND METHOD FOR PERFORMING AN ON-LINE CHECK OF A FILE SYSTEM, by John K. Edwards, the teachings of which are expressly incorporated herein by reference.

FIELD OF THE INVENTION

The present invention relates to file systems and, more specifically, to verifying and restoring the consistency of mappings from data containers to their corresponding parent directories in a file system.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage (NAS) environment, a storage area network (SAN) and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

Storage of information on the disk array is preferably implemented as one or more storage "volumes" of physical disks, defining an overall logical arrangement of disk space. The disks within a volume are typically organized as one or more groups, wherein each group may be operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of redundant information (parity) with respect to the striped data. The physical disks of each RAID group may include disks configured to store striped data (i.e., data disks) and disks configured to store parity for the data (i.e., parity disks). The parity may thereafter be retrieved to enable recovery of data lost when a disk fails. The term "RAID" and its various implementations are well-known and disclosed in *A Case for Redundant Arrays of Inexpensive Disks (RAID)*, by D. A. Patterson, G. A. Gibson and R. H. Katz, Proceedings of the International Conference on Management of Data (SIGMOD), June 1988.

The storage operating system of the storage system may implement a high-level module, such as a file system, to logically organize the information stored on the disks as a hierarchical structure of directories, files and blocks. For example, each "on-disk" file may be implemented as set of data structures, i.e., disk blocks, configured to store information, such as the actual data for the file. These data blocks are organized within a volume block number (vbn) space that is maintained by the file system. The file system organizes the data blocks within the vbn space as a "logical volume"; each logical volume may be, although is not necessarily, associated with its own file system. The file system typically consists of a contiguous range of vbns from zero to n, for a file system of size n+1 blocks.

A known type of file system is a write-anywhere file system that does not over-write data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL®) file system available from Network Appliance, Inc., of Sunnyvale, Calif.

The storage system may be configured to operate according to a client/server model of information delivery to thereby allow many clients to access the directories, files and blocks stored on the system. In this model, the client may comprise an application, such as a database application, executing on a computer that "connects" to the storage system over a computer network, such as a point-to-point link, shared local area network, wide area network or virtual private network implemented over a public network, such as the Internet. Each client may request the services of the file system by issuing file system protocol messages (in the form of packets) to the storage system over the network. By supporting a plurality of file system protocols, such as the conventional Common Internet File System (CIFS) and the Network File System (NFS) protocols, the utility of the storage system is enhanced.

Each data container, such as a file, directory, etc., within a file system is typically associated with an inode that serves as the root of a buffer tree of the data container. The buffer tree is an internal representation of blocks for the data container stored in the memory of the storage system and maintained by the file system. The inode is a data structure used to store information, such as metadata, about the data container, whereas the data blocks are structures used to store the actual data for the container. The inode typically contains a set of pointers to other blocks within the file system. For data containers, such as files, that are sufficiently small, the inode may directly point to blocks storing the data of the file. However, for larger files, the inode points to one or more levels of indirect blocks, which, in turn, may point to additional levels of indirect blocks and/or the blocks containing the data.

Certain events occurring within the storage system and/or a storage operating system executing thereon may result in a message being displayed to an administrator. For example, the storage system may detect that one or more data containers have become corrupted. A pathname provides a way for the administrator to refer to a data container served by the storage system. To that end, each pathname typically represents one data container within the hierarchical structure of the file system. However, the storage system typically reports the identity of the data container to the administrator by using its associated inode number. The inode number is used internally within the file system to identify the inode associated with the data container and, unfortunately, is not easily understood by humans. It is therefore desirous for the administrator to know the pathname of the data container to which the message relates so that appropriate action may be taken. One technique for generating inode to pathname information (I2P) is described in the above incorporated U.S. Pat. No. 7,739,318, entitled SYSTEM AND METHOD FOR GENERATING AND MAINTAINING INODE TO PATHNAME MAPPING INFORMATION, by Edward Zayas, et al. In such an environment, a primary name data structure is included within each inode. The primary name data structure contains information identifying a specific directory entry associated with a primary name of the data container. Illustratively, additional names for a data container, e.g., hard links, may be stored in an alternate name file in a metadata directory within the file system.

In systems that contain I2P mapping information, it is possible for the persistently stored I2P information to become corrupted. For example, memory may become corrupted due to hardware failures. Such memory corruption may be stored as I2P information on disk, thereby resulting in inconsistent I2P information. Other causes of errors may be file system errors and/or data corruption due to errors in applications attempting to retrieve I2P mapping information.

A "brute force" technique for correcting the consistency of I2P information is to delete all of the I2P information and to recompute that information for an entire volume associated with a storage system. A noted disadvantage of such a brute force technique is that in a system with tens or hundreds of millions of data containers, the time required to reconstruct all of the I2P mapping information may be significant. Additionally, while the I2P information is being reconstructed, any commands that attempt to retrieve I2P information will fail.

SUMMARY OF THE INVENTION

The present invention overcomes the disadvantages of the prior art by providing a system and method for verifying and restoring the consistency of inode to pathname mappings from a data container to its parent directory within a file system of a storage system. In a first embodiment, an off-line volume verification tool is modified to, inter alia, verify the consistency of I2P information within the file system. Any primary name data structures that are identified as inconsistent are repaired so that each data structure contains the appropriate information representative of the primary name for the data container, such as a file. An alternate name file is verified and if inconsistencies are noted therein, the alternate name file is deleted and an I2P name mapping scanner is invoked to reconstruct the alternate name file.

In a second embodiment of the invention, an on-line file system verification tool verifies the consistency of I2P information within the file system. The on-line verification tool modifies function calls (LoadInode( )) and buffer trees (LoadBuffer( )) within a storage operating system that load inodes and contents of buffer trees. Before an inode or buffer tree is returned to a process that called the loading function the verification tool performs a check of the inode and related buffer trees. Illustratively, this check includes, inter alia, verifying and repairing the consistency of the I2P information associated with the inode. In this second illustrative embodiment, a background process is initiated that sequentially loads inodes to ensure that all of the inodes of the file system are checked, even if another process or application does not request a particular inode.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Storage System Environment

Figure 1:
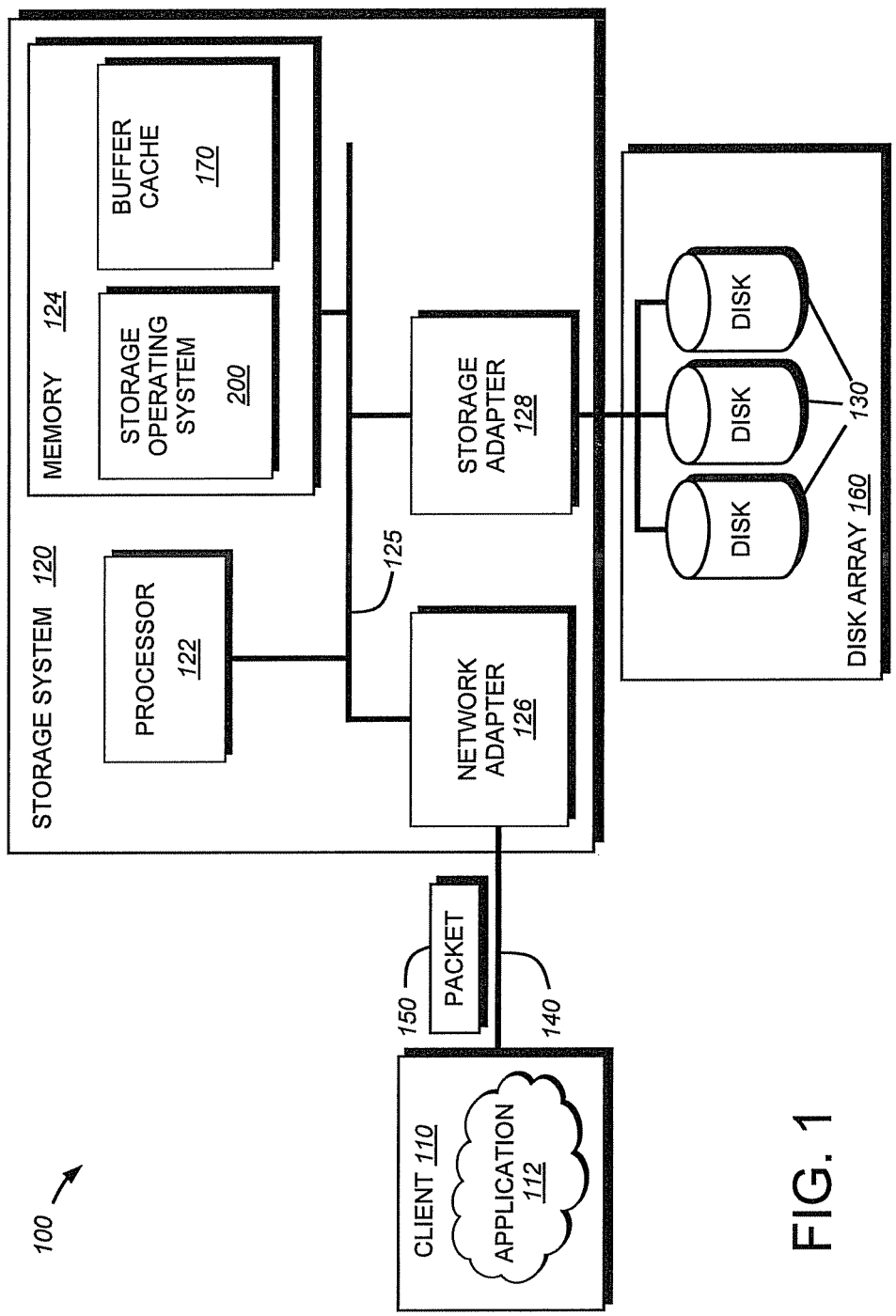
FIG. 1 is a schematic block diagram of an exemplary storage system environment in accordance with an embodiment of the present invention.

FIG. 1 is a schematic block diagram of an environment 100 including a storage system 120 that may be advantageously used with the present invention. The storage system is a computer that provides storage service relating to the organization of information on storage devices, such as disks 130 of a disk array 160. The storage system 120 comprises a processor 122, a memory 124, a network adapter 126 and a storage adapter 128 interconnected by a system bus 125. The storage system 120 also includes a storage operating system 200 that preferably implements a high-level module, such as a file system, to logically organize the information as a hierarchical structure of directories, files and virtual disks ("vdisks") on the disks.

In the illustrative embodiment, the memory 124 comprises storage locations that are addressable by the processor and adapters for storing software program code. A portion of the memory may be further organized as a "buffer cache" 170 for storing certain data structures associated with the present invention. The processor and adapters may, in turn, comprise processing elements and/or logic circuitry configured to execute the software code and manipulate the data structures. Storage operating system 200, portions of which are typically resident in memory and executed by the processing elements, functionally organizes the system 120 by, inter alia, invoking storage operations executed by the storage system. It will be apparent to those skilled in the art that other processing and memory means, including various computer-readable media, may be used for storing and executing program instructions pertaining to the inventive technique described herein.

The network adapter 126 comprises the mechanical, electrical and signaling circuitry needed to connect the storage system 120 to a client 110 over a computer network 140, which may comprise a point-to-point connection or a shared medium, such as a local area network. Illustratively, the computer network 140 may be embodied as an Ethernet network or a Fibre Channel (FC) network. The client 110 may communicate with the storage system over network 140 by exchanging discrete frames or packets of data 150 according to pre-defined protocols, such as the Transmission Control Protocol/Internet Protocol (TCP/IP).

The client 110 may be a general-purpose computer configured to execute applications 112. Moreover, the client 110 may interact with the storage system 120 in accordance with a client/server model of information delivery. That is, the client may request the services of the storage system, and the system may return the results of the services requested by the client, by exchanging packets 150 over the network 140. The clients may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The storage adapter 128 cooperates with the storage operating system 200 executing on the system 120 to access information requested by a user (or client). The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130, such as HDD and/or DASD, of array 160. The storage adapter includes input/output (I/O) interface circuitry that couples to the disks over an I/O interconnect arrangement, such as a conventional high-performance, FC serial link topology.

Storage of information on array 160 is preferably implemented as one or more storage "volumes" that comprise a collection of physical storage disks 130 cooperating to define an overall logical arrangement of volume block number (vbn) space on the volume(s). Alternately, the information may be implemented as one or more aggregates comprising of one or more flexible (virtual) volumes. Aggregates and flexible volumes are described in detail in U.S. Pat. No. 7,409,494, entitled EXTENSION OF WRITE ANYWHERE FILE SYSTEM LAYOUT, by John K. Edwards, et al.

The disks within the file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

B. Storage Operating System

To facilitate access to the disks 130, the storage operating system 200 illustratively implements a write-anywhere file system that cooperates with virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization modules allow the file system to further logically organize information as a hierarchical structure of blocks on the disks that are exported as named logical unit numbers (luns).

In the illustrative embodiment, the storage operating system is preferably the NetApp® Data ONTAP™ operating system available from Network Appliance, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

Figure 2:
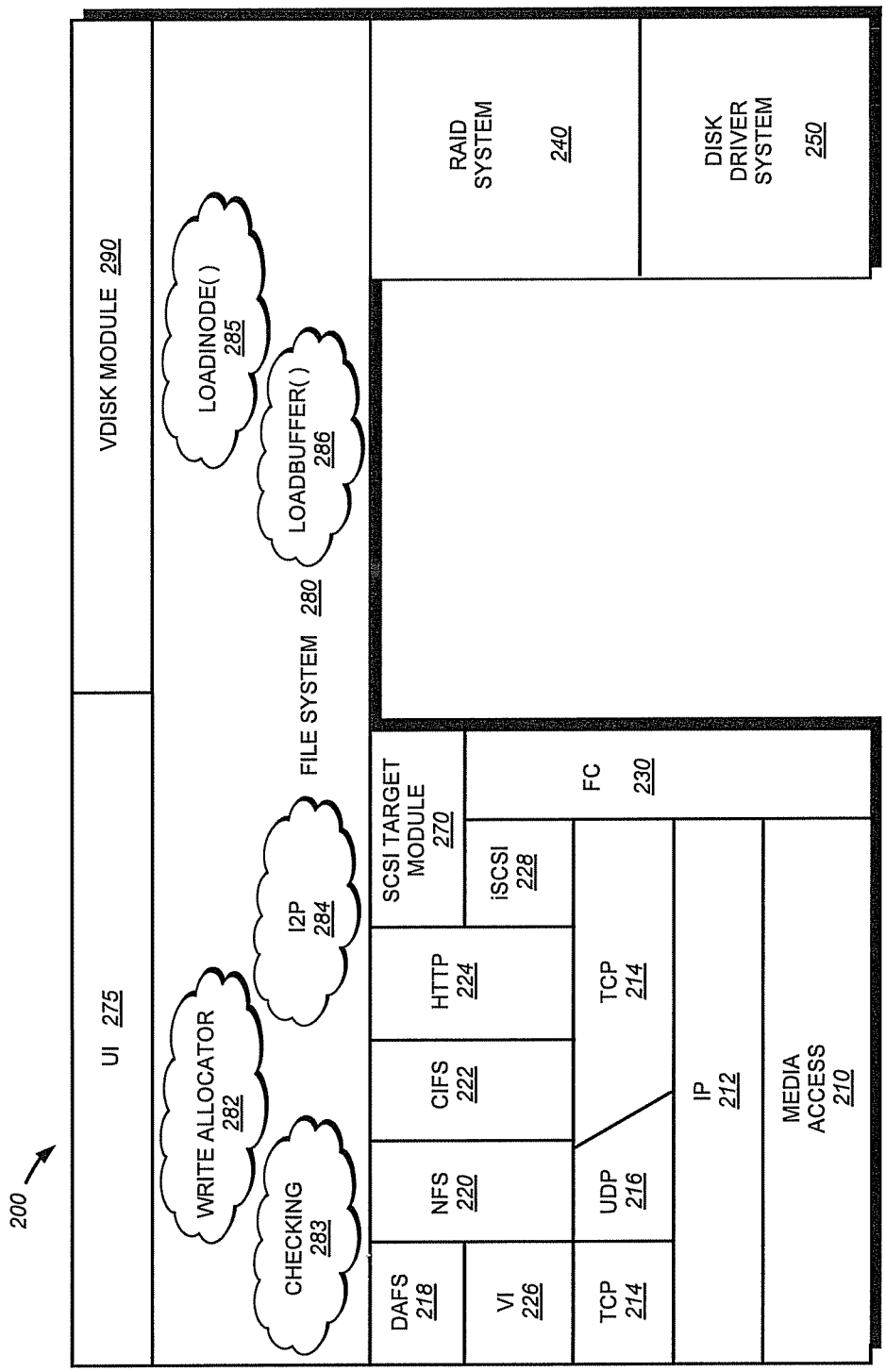
FIG. 2 is a schematic block diagram of a storage operating system in accordance with an embodiment of the present invention.

FIG. 2 is a schematic block diagram of the storage operating system 200 that may be advantageously used with the present invention. The storage operating system comprises a series of software layers organized to form an integrated network protocol stack or, more generally, a multi-protocol engine that provides data paths for clients to access information stored on the storage system using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for, inter alia, the Direct Access File System (DAFS) protocol 218, the NFS protocol 220, the CIFS protocol 222 and the Hypertext Transfer Protocol (HTTP) protocol 224. A VI layer 226 implements the VI architecture to provide direct access transport (DAT) capabilities, such as RDMA, as required by the DAFS protocol 218.

An iSCSI driver layer 228 provides block protocol access over the TCP/IP network protocol layers, while a FC driver layer 230 receives and transmits block access requests and responses to and from the storage system. The FC and iSCSI drivers provide FC-specific and iSCSI-specific access control to the blocks and, thus, manage exports of luns to either iSCSI or FCP or, alternatively, to both iSCSI and FCP when accessing the blocks on the storage system. In addition, the storage operating system includes a storage module embodied as a RAID system 240 that manages the storage and retrieval of information to and from the volumes/disks in accordance with I/O operations, and a disk driver system 250 that implements a disk access protocol such as, e.g., the SCSI protocol.

Bridging the disk software layers with the integrated network protocol stack layers is a virtualization system that is implemented by a file system 280 interacting with virtualization modules illustratively embodied as, e.g., vdisk module 290 and SCSI target module 270. The vdisk module 290 cooperates with the file system 280 to enable access by administrative interfaces, such as a user interface (UI) 275, in response to a user (system administrator) issuing commands to the storage system. The SCSI target module 270 is disposed between the FC and iSCSI drivers 228, 230 and the file system 280 to provide a translation layer of the virtualization system between the block (lun) space and the file system space, where luns are represented as blocks. The UI 275 is disposed over the storage operating system in a manner that enables administrative or user access to the various layers and systems.

The file system is illustratively a message-based system that provides logical volume management capabilities for use in access to the information stored on the storage devices, such as disks. That is, in addition to providing file system semantics, the file system 280 provides functions normally associated with a volume manager. These functions include (i) aggregation of the disks, (ii) aggregation of storage bandwidth of the disks, and (iii) reliability guarantees, such as mirroring and/or parity (RAID). The file system 280 illustratively implements the WAFL file system (hereinafter generally the "write-anywhere file system") having an on-disk format representation that is block-based using, e.g., 4 kilobyte (KB) blocks and using index nodes ("inodes") to identify files and file attributes (such as creation time, access permissions, size and block location). The file system uses files to store metadata describing the layout of its file system; these metadata files include, among others, an inode file. A file handle, i.e., an identifier that includes an inode number, is used to retrieve an inode from disk.

Broadly stated, all inodes of the write-anywhere file system are organized into the inode file. Volume information (volinfo) and file system information (fsinfo) blocks specify the layout of information in the file system, the latter block including an inode of a file that includes all other inodes of the file system (the inode file). Each logical volume (file system) has an fsinfo block that is preferably stored at a fixed location within, e.g., a RAID group. The inode of the fsinfo block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file.

Operationally, a request from the client 110 is forwarded as a packet 150 over the computer network 140 and onto the storage system 120 where it is received at the network adapter 126. A network driver (of layer 210 or layer 230) processes the packet and, if appropriate, passes it on to a network protocol and file access layer for additional processing prior to forwarding to the write-anywhere file system 280. Here, the file system generates operations to load (retrieve) the requested data from disk 130 if it is not resident "in-core", i.e., in the buffer cache 170. If the information is not in the cache, the file system 280 indexes into the inode file using the inode number to access an appropriate entry and retrieve a logical volume block number (vbn). The file system then passes a message structure including the logical vbn to the RAID system 240; the logical vbn is mapped to a disk identifier and disk block number (disk,dbn) and sent to an appropriate driver (e.g., SCSI) of the disk driver system 250. The disk driver accesses the dbn from the specified disk 130 and loads the requested data block(s) in buffer cache 170 for processing by the storage system. Upon completion of the request, the storage system (and operating system) returns a reply to the client 110 over the network 140.

Included in the storage operating system 200 is a set of inode to pathname (I2P) functions 284. The I2P functions 284, in conjunction with the file system 280, illustratively implement I2P mapping functionality in accordance with the present invention. One exemplary technique for I2P mappings is described in the above-incorporated U.S. Pat. No. 7,739,318. The I2P functions 284 may include various scanners, described further below, that operate to install/remove I2P mappings in accordance with embodiments of the present invention. Additionally, the I2P functions 284 may include an application program interface (API) that is exposed to enable other processes executing within the storage operating system to perform I2P mappings. The API may also be accessible via remote procedure calls (RPCs) to enable programs executing on other computers in network environment 100 to perform I2P mapping functions.

Also included within the file system 280 is a set of checking processes 283 that implement the novel verification and consistency checking procedures of the present invention. In accordance with a first embodiment of the invention, the checking processes 283 include an off-line file system verification procedure, described further below, that may be executed by an administrator. In a second embodiment of the present invention, the checking processes 283 may comprise an on-line verification procedure that modifies function calls within the storage operating system that load inodes (LoadInode( ) 285) and buffer trees (LoadBuffer( ) 286) so that before each inode or buffer tree is returned to a process that called the loading function, a check is performed of the inode and related buffer trees. When a process executing within the storage operating system calls either the LoadInode( ) 285 or LoadBuffer( ) 286 functions, the modified function suspends the return of the requested object until a check is performed. The modified function loads the requested inode or buffer tree and determines if it is associated with a data container, e.g., a file or a directory. If the requested inode is a regular file inode, then the checking procedure verifies associated buffer trees of the inode. If the selected inode is a directory inode, then the checking procedure performs a directory check of the selected inode. Both the file and directory checks verify that the I2P information associated with the data container is correct. Additionally, in the second embodiment relating to an on-line verification procedure, a background process is initiated that sequentially loads inodes. This background process ensures that all inodes of the file system are checked, even if another process or application does not request a particular inode.

It should be noted that the software "path" through the storage operating system layers described above needed to perform data storage access for the client request received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system 120 in response to a request issued by client 110. Moreover, in another alternate embodiment of the invention, the processing elements of adapters 126, 128 may be configured to offload some or all of the packet processing and storage access operations, respectively, from processor 122, to thereby increase the performance of the storage service provided by the system. It is expressly contemplated that the various processes, architectures and procedures described herein can be implemented in hardware, firmware or software.

As used herein, the term "storage operating system" generally refers to the computer-executable code operable to perform a storage function in a storage system, e.g., that manages data access and may implement file system semantics. In this sense, the ONTAP software is an example of such a storage operating system implemented as a microkernel and including the file system module to implement the write anywhere file system semantics and manage data access. The storage operating system can also be implemented as an application program operating over a general-purpose operating system, such as UNIX® or Windows XP®, or as a general-purpose operating system with configurable functionality, which is configured for storage applications as described herein.

In addition, it will be understood to those skilled in the art that the inventive technique described herein may apply to any type of special-purpose (e.g., file server, filer or storage appliance) or general-purpose computer, including a standalone computer or portion thereof, embodied as or including a storage system 120. An example of a storage appliance that may be advantageously used with the present invention is described in U.S. patent application Ser. No. 10/215,917 titled, MULTI-PROTOCOL STORAGE APPLIANCE THAT PROVIDES INTEGRATED SUPPORT FOR FILE AND BLOCK ACCESS PROTOCOLS, filed on Aug. 9, 2002, now issued as U.S. Pat. No. 7,873,700 on Jan. 18, 2011. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

C. Volume Structure

The file system, such as the write-anywhere file system, maintains information about the geometry of the underlying physical disks (e.g., the number of blocks in each disk) in the storage system. The RAID system provides the disk geometry information to the file system for use when creating and maintaining the vbn-to-disk,dbn mappings used to perform write allocation operations. The file system maintains block allocation data structures, such as an active map, a space map, a summary map and snapshot maps. These mapping data structures describe which blocks are currently in use and which are available for use and are used by a write allocator 282 of the file system 280 as existing infrastructure for the logical volume.

Specifically, the snapshot map denotes a bitmap file describing which blocks are used by a snapshot. The write-anywhere file system (such as the WAFL file system) has the capability to generate a snapshot of its active file system. An "active file system" is a file system to which data can be both written and read or, more generally, an active store that responds to both read and write I/O operations. It should be noted that "snapshot" is a trademark of Network Appliance, Inc. and is used for purposes of this patent to designate a persistent consistency point (CP) image. A persistent consistency point image (PCPI) is a space conservative, point-in-time, read-only image of data accessible by name that provides a consistent image of that data (such as a storage system) at some previous time. More particularly, a PCPI is a point-in-time representation of a storage element, such as an active file system, file or database, stored on a storage device (e.g., on disk) or other persistent memory and having a name or other identifier that distinguishes it from other PCPIs taken at other points in time. A PCPI can also include other information (metadata) about the active file system at the particular point in time for which the image is taken. The terms "PCPI" and "snapshot" may be used interchangeably through out this patent without derogation of Network Appliance's trademark rights.

The write-anywhere file system supports (maintains) multiple PCPIs that are generally created on a regular schedule. Each PCPI refers to a copy of the file system that diverges from the active file system over time as the active file system is modified. Each PCPI is a restorable version of the storage element (e.g., the active file system) created at a predetermined point in time and, as noted, is "read-only" accessible and "space-conservative". Space conservative denotes that common parts of the storage element in multiple snapshots share the same file system blocks. Only the differences among these various PCPIs require extra storage blocks. The multiple PCPIs of a storage element are not independent copies, each consuming disk space; therefore, creation of a PCPI on the file system is instantaneous, since no entity data needs to be copied. Read-only accessibility denotes that a PCPI cannot be modified because it is closely coupled to a single writable image in the active file system. The closely coupled association between a file in the active file system and the same file in a PCPI obviates the use of multiple "same" files. In the example of a WAFL file system, PCPIs are described in TR3002 *File System Design for a NFS File Server Appliance* by David Hitz et al., published by Network Appliance, Inc. and in U.S. Pat. No. 5,819,292 entitled METHOD FOR MAINTAINING CONSISTENT STATES OF A FILE SYSTEM AND FOR CREATING USER-ACCESSIBLE READ-ONLY COPIES OF A FILE SYSTEM, by David Hitz et al., each of which is hereby incorporated by reference as though full set forth herein.

The active map denotes a bitmap file describing which blocks are used by the active file system. As previously described, a PCPI may contain metadata describing the file system as it existed at the point in time that the image was taken. In particular, a PCPI captures the active map as it existed at the time of PCPI creation; this file is also known as the snapshot map for the PCPI. Note that a snapshot map denotes a bitmap file describing which blocks are used by a PCPI. The summary map denotes a file that is an inclusive logical OR bitmap of all snapshot maps. By examining the active and summary maps, the file system can determine whether a block is in use by either the active file system or any PCPI. The space map denotes a file including an array of numbers that describes the number of storage blocks used in a block allocation area. In other words, the space map is essentially a logical OR bitmap between the active and summary maps to provide a condensed version of available "free block" areas within the vbn space. Examples of PCPI and block allocation data structures, such as the active map, space map and summary map, are described in U.S. Pat. No. 7,454,445, titled WRITE ALLOCATION BASED ON STORAGE SYSTEM MAP AND SNAPSHOT, by Blake Lewis et al. and issued on Nov. 18, 2008, which is hereby incorporated by reference.

Figure 3:
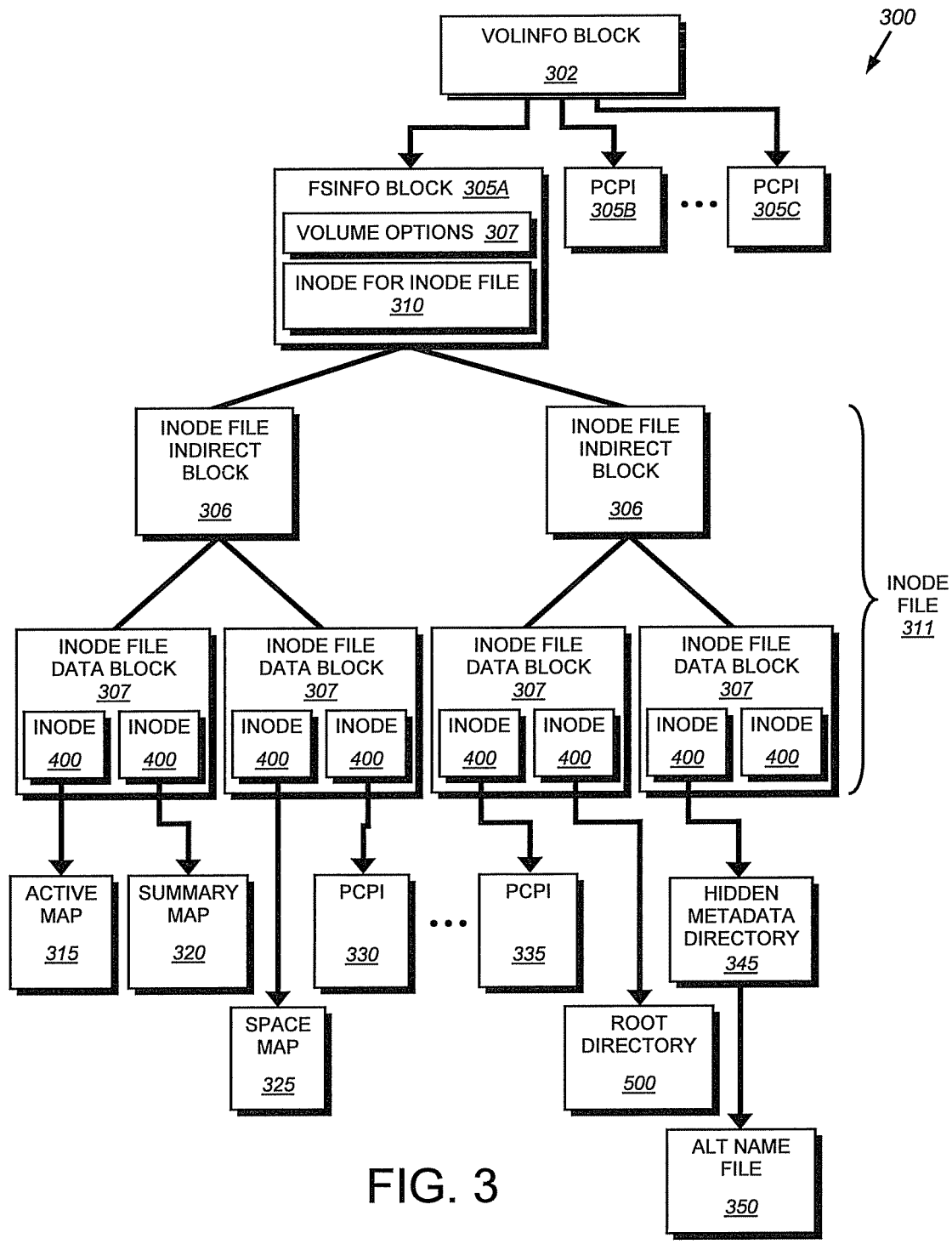
FIG. 3 is a schematic block diagram of an exemplary volume buffer tree in accordance with an embodiment of the present invention.

FIG. 3 is a schematic block diagram of an exemplary on-disk storage structure 300 of a volume of a storage system. As noted, a volume is typically associated with a file system and comprises data blocks organized within a vbn space. Each volume has a volinfo block that is preferably stored at a fixed location within, e.g., a RAID group. A volinfo block 302 is the root of the volume. The volinfo block contains pointers to one or more fsinfo blocks 305A, B, C. Fsinfo block 305A is associated with the active file system, while fsinfo blocks 305B, C may be associated with PCPIs of the volume 300. An example of PCPIs associated with a volinfo block 302 is described in U.S. Pat. No. 7,313,720, issued on Dec. 25, 2007, entitled TECHNIQUE FOR INCREASING THE NUMBER OF PERSISTENT CONSISTENCY POINT IMAGES IN A FILE SYSTEM, by Emily Eng, et al.

The fsinfo block 305A includes a variety of metadata that describes the state of the file system. Fsinfo block 305A contains a set of volume options 307 including whether I2P mapping is active for the volume 300. In the illustrative embodiment, I2P mapping may be activated/deactivated on a per volume basis. An administrator may activate the I2P mapping using a command line interface (CLI) command implemented by the UI 275 of the storage operating system 200. An example of such a CLI command is the following volume command:

vol options <volume name> i2p [on|off]

where vol is the name of the command and options denotes that the administrator desires to modify one of the volume options. The volume is identified in the <volume name> field. The i2p setting specifies whether the I2P mapping option is to be activated (on) or deactivated (off). In an illustrative embodiment, the volume may default to activating the I2P mapping. Illustratively, the storage operating system 200 includes a programmatic remote procedure call (RPC) interface that provides the same functionality as that available via CLI commands embodied within the UI 275.

The fsinfo block 305A also contains an inode for an inode file 310. All inodes of the write-anywhere file system are organized into the inode file 311. Like any other file, the inode of the inode file is the root of the buffer tree that describes the locations of blocks of the file. As such, the inode of the inode file may directly reference (point to) data blocks 307 of the inode file 311 or may reference indirect blocks 306 of the inode file 311 that, in turn, reference data blocks of the inode file. In this example, the inode for the inode file 310 includes an exemplary buffer tree comprising a plurality of inode file indirect blocks 306 that, in turn, point to inode file data blocks 307. Within each data block of the inode file are inodes 400, each of which serves as the root of a file. Among the inodes of the inode file 310 are inodes for special metadata files, such as an active map 315, a summary map 320, a space map 325, a root directory 500 and a metadata directory 345. All user files in the file system are organized under the root directory 500, while various metadata files associated with the file system are stored under the metadata directory 345. Illustratively, the alternate name file 350 is located in the hidden metadata directory 345. The alternate name file 350 is utilized to store I2P mapping information associated with alternate names of an inode and is illustratively implemented as a B+ tree to enable fast searches.

The inode file may further include inodes that reference a plurality of PCPIs 330, 335. These PCPI inodes are the root level inodes of PCPIs of the active file system. Each volume has special reserved inode numbers within its vbn space. In certain illustrative embodiments, a plurality of those inode numbers (e.g., 31) is reserved for PCPIs. When a PCPI of the active file system is generated, a copy of the inode for the inode file is also generated (hereinafter the "snapshot root") and assigned one of the reserved PCPI inode numbers. Thus, to access a PCPI at a particular point in time, the storage operating system accesses the appropriate PCPI root of the PCPI. In other illustrative embodiments, only the PCPI root inodes are utilized.

D. Inode Structure

Figure 4:
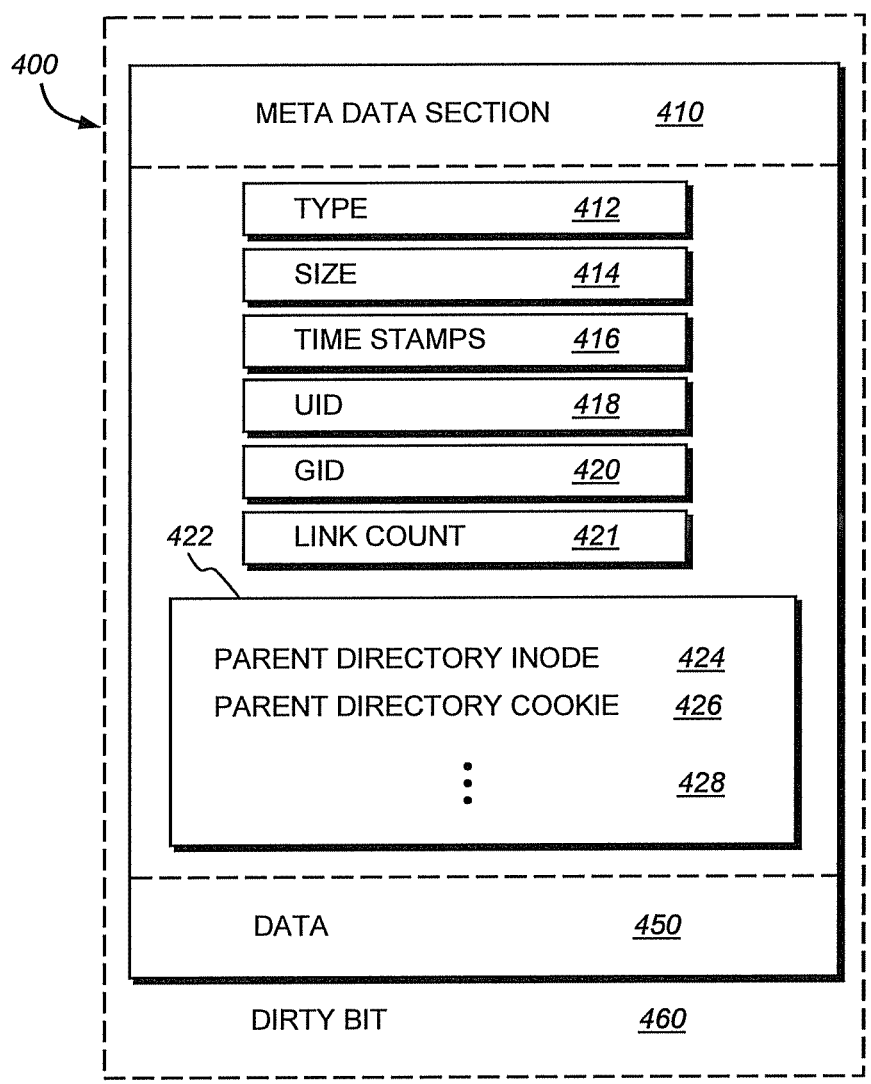
FIG. 4 is a schematic block diagram of an inode in accordance with an embodiment of the present invention.

In the illustrative embodiment, a data container, such as a file, is represented in the write-anywhere file system as an inode data structure adapted for storage on the disks 130. FIG. 4 is a schematic block diagram of an inode 400, which illustratively includes a metadata section 410 and a data section 450. The information stored in the metadata section 410 of each inode 400 describes the data container and, as such, includes the type (e.g., regular, directory, virtual disk) 412 of data container, the size 414 of the data container, time stamps (e.g., access and/or modification) 416 for the data container, ownership, i.e., user identifier (UID 418) and group ID (GID 420), of the data container, a link count field 421 and a novel primary name data structure 422. The link count field 421 tracks the number of names (and, implicitly, the number of hard links) associated with the inode. For example, a link count of one signifies that there are no hard links to the data container and that the only name associated with the inode is the primary name.

The primary name data structure 422 illustratively includes a parent directory inode field 424, a parent directory cookie field 426 and, in alternative embodiments, additional fields 428. The parent directory inode field 424 contains an inode value that is associated with the parent directory of the data container. Thus, if the data container is a file bar located in the foo directory (i.e., /foo/bar) then the parent directory inode field contains the inode number of the foo directory. The parent directory cookie field 426 illustratively contains a multi-bit value that identifies a directory block and entry within the directory block of the directory identified by the parent directory inode field 424.

The contents of the data section 450 of each inode may be interpreted differently depending upon the type of data container (inode) defined within the type field 412. For example, the data section 450 of a directory inode contains metadata controlled by the file system, whereas the data section of a file inode contains file system data. In this latter case, the data section 450 includes a representation of the data associated with the file.

Specifically, the data section 450 of a regular on-disk inode may include file system data or pointers, the latter referencing 4 KB data blocks on disk used to store the file system data. Each pointer is preferably a logical vbn to facilitate efficiency among the file system and the RAID system 240 when accessing the data on disks. Given the restricted size (e.g., 192 bytes) of the inode, file system data having a size that is less than or equal to 64 bytes is represented, in its entirety, within the data section of that inode. However, if the file system data is greater than 64 bytes but less than or equal to 64 KB, then the data section of the inode (e.g., a first level inode) comprises up to 16 pointers, each of which references a 4 KB block of data on the disk.

Moreover, if the size of the data is greater than 64 KB but less than or equal to 64 megabytes (MB), then each pointer in the data section 450 of the inode (e.g., a second level inode) references an indirect block (e.g., a first level block) that illustratively contains 1024 pointers, each of which references a 4 KB data block on disk. For file system data having a size greater than 64 MB, each pointer in the data section 450 of the inode (e.g., a third level inode) references a double-indirect block (e.g., a second level block) that contains 1024 pointers, each referencing an indirect (e.g., a first level) block. The indirect block, in turn, that contains 1024 pointers, each of which references a 4 KB data block on disk. When accessing a file, each block of the file may be loaded from disk 130 into the buffer cache 170.

When an on-disk inode (or block) is loaded from disk 130 into buffer cache 170, its corresponding in-core structure embeds the on-disk structure. For example, the dotted line surrounding the inode 400 indicates the in-core representation of the on-disk inode structure. The in-core structure is a block of memory that stores the on-disk structure plus additional information needed to manage data in the memory (but not on disk). The additional information may include, e.g., a "dirty" bit 460. After data in the inode (or block) is updated/modified as instructed by, e.g., a write operation, the modified data is marked "dirty" using the dirty bit 460 so that the inode (block) can be subsequently "flushed" (stored) to disk. The in-core and on-disk format structures of the WAFL file system, including the inodes and inode file, are disclosed and described in the previously incorporated U.S. Pat. No. 5,819,292 titled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued on Oct. 6, 1998.

Figure 5:
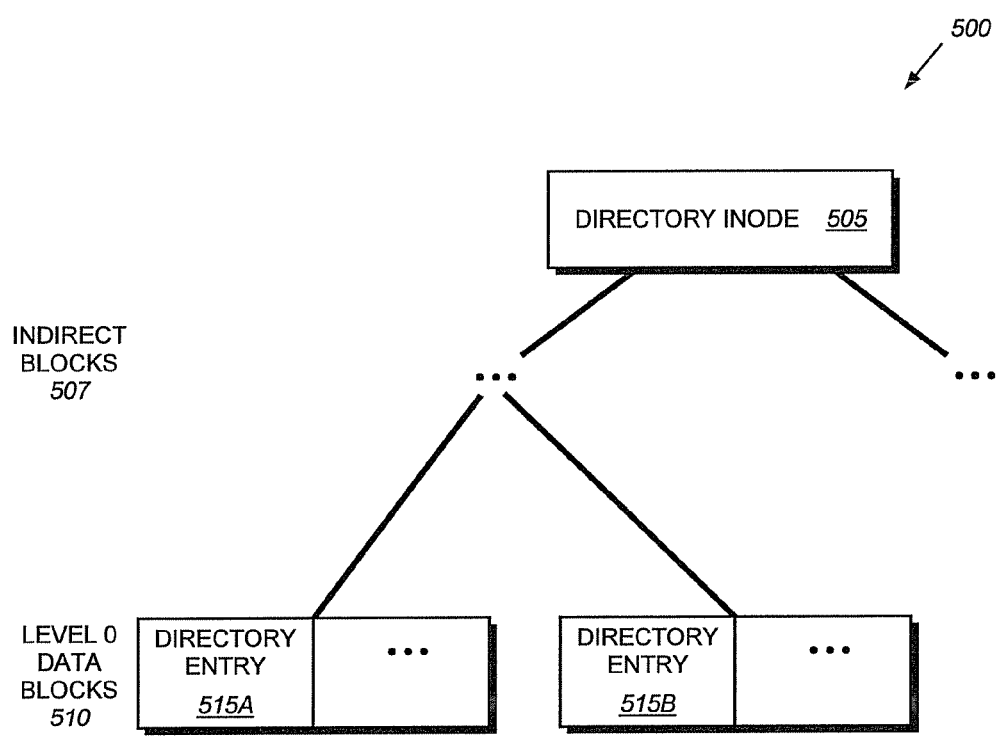
FIG. 5 is a schematic block diagram of an exemplary directory buffer tree in accordance with an embodiment of the present invention.

FIG. 5 is a schematic block diagram of an exemplary root directory buffer tree 500 in accordance with an embodiment of the present invention. The directory buffer tree 500 contains a directory inode 505 at its root. Depending on the size of the directory, there may be one or more levels of indirect blocks 507 between the directory inode 505 and the data blocks 510 of the directory. Each data block 510 comprises one or more directory entries 515 A,B. In accordance with the illustrative embodiment of the present invention, the parent directory cookie value 426 uniquely identifies a particular directory entry within the directory identified by the parent directory inode field 424. That is, the inode identified by the parent directory inode field 424 identifies a directory inode 505. The parent directory cookie value 426 identifies a particular level 0 data block 510 of the directory and a particular directory entry 515 within that level 0 data block 510.

E. I2P Mapping Operations

As described in the above-incorporated U.S. Pat. No. 7,739,318, the I2P functions 284 of the storage operating system 200 operate in conjunction with the file system 280 to permit processes to read and/or write I2P information from either a primary name data structure within an inode or from an alternate name file. Such reading/writing operations, described further below, may be utilized by the various checking processes of the present invention when determining whether the I2P information is consistent or when repairing the I2P information during the course of the verification procedure. In accordance with the illustrative embodiment of the present invention, any reading/writing techniques for obtaining/setting the I2P information may be utilized. As such, these procedures should be taken as exemplary only.

Figure 6:
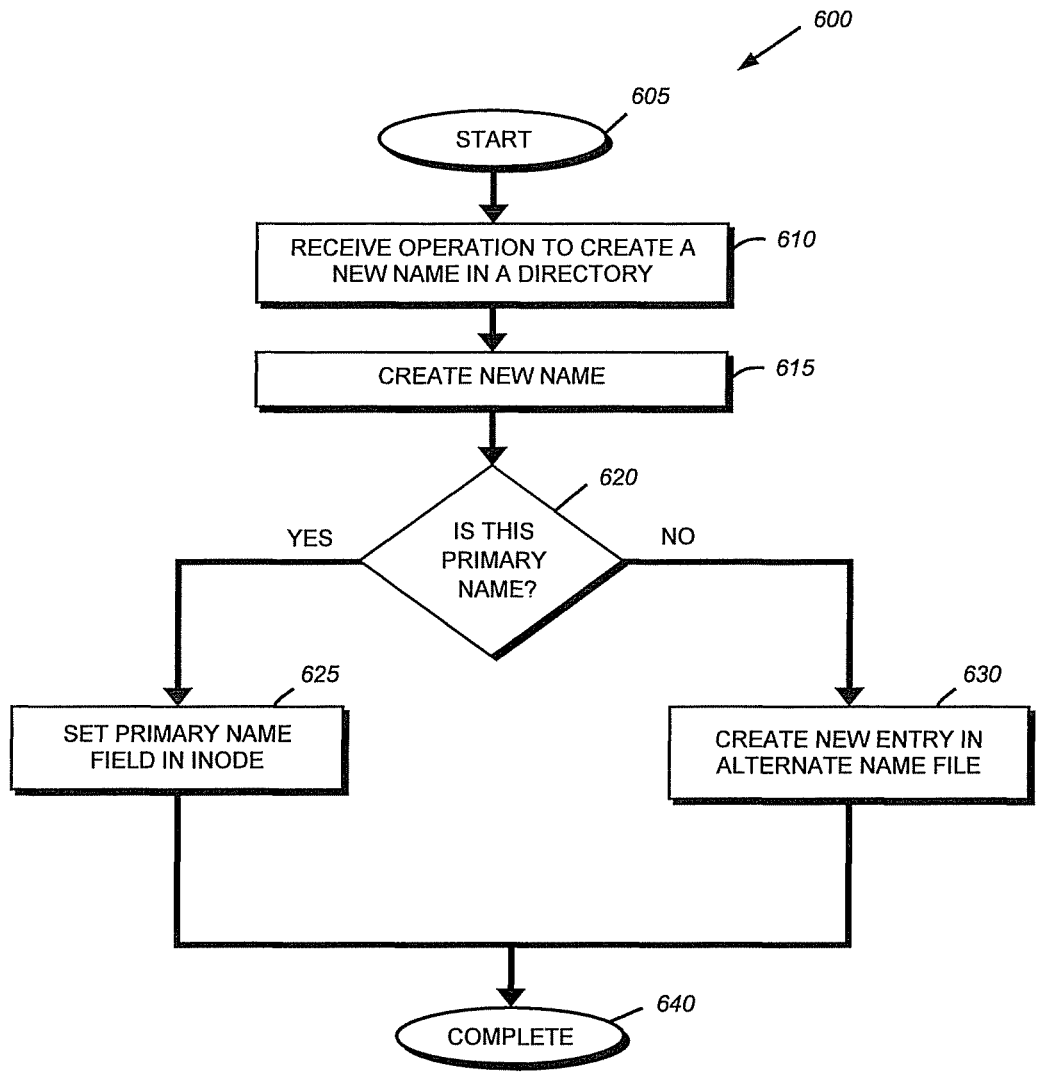
FIG. 6 is a flowchart detailing the steps of a procedure for creating a new name and associated inode to pathname mapping information in accordance with an embodiment of the present invention.

FIG. 6 is a flowchart detailing the steps of a procedure 600 for creating a new name in a directory in accordance with an embodiment of the present invention. Procedure 600 is illustratively performed by the file system and associated I2P functions when a data container is first created and/or a new hard link is generated to a particular data container. The procedure 600 begins in step 605 and continues to step 610 where the file system receives an operation to create a new name in a particular directory. As noted above, the operation may be a create file operation or a create hard link operation. In response, the file system creates the new name in step 615 using conventional file system operations. In step 620, the file system, in conjunction with the I2P functions 284, determine whether the new name is the primary name for the data container. If, for example, the operation is a create file operation, the new name is the primary name because the data container is associated with no other name. However, if the operation is a create hard link operation, then the data container already has a primary name reflecting the name of the data container originally created. If the new name is the primary name, the procedure branches to step 625 where the file system and I2P functions load the appropriate fields within the primary name data structure of the inode. The procedure then completes in step 640. However, if in step 620, a determination is made that the new name is not the primary name, then the procedure continues to step 630 where the file system and I2P functions create a new entry in the alternate name file. As noted above, this entry is illustratively stored as a triplet of the inode, the parent directory inode and the parent directory cookie value. The procedure then completes in step 640.

Figure 7:
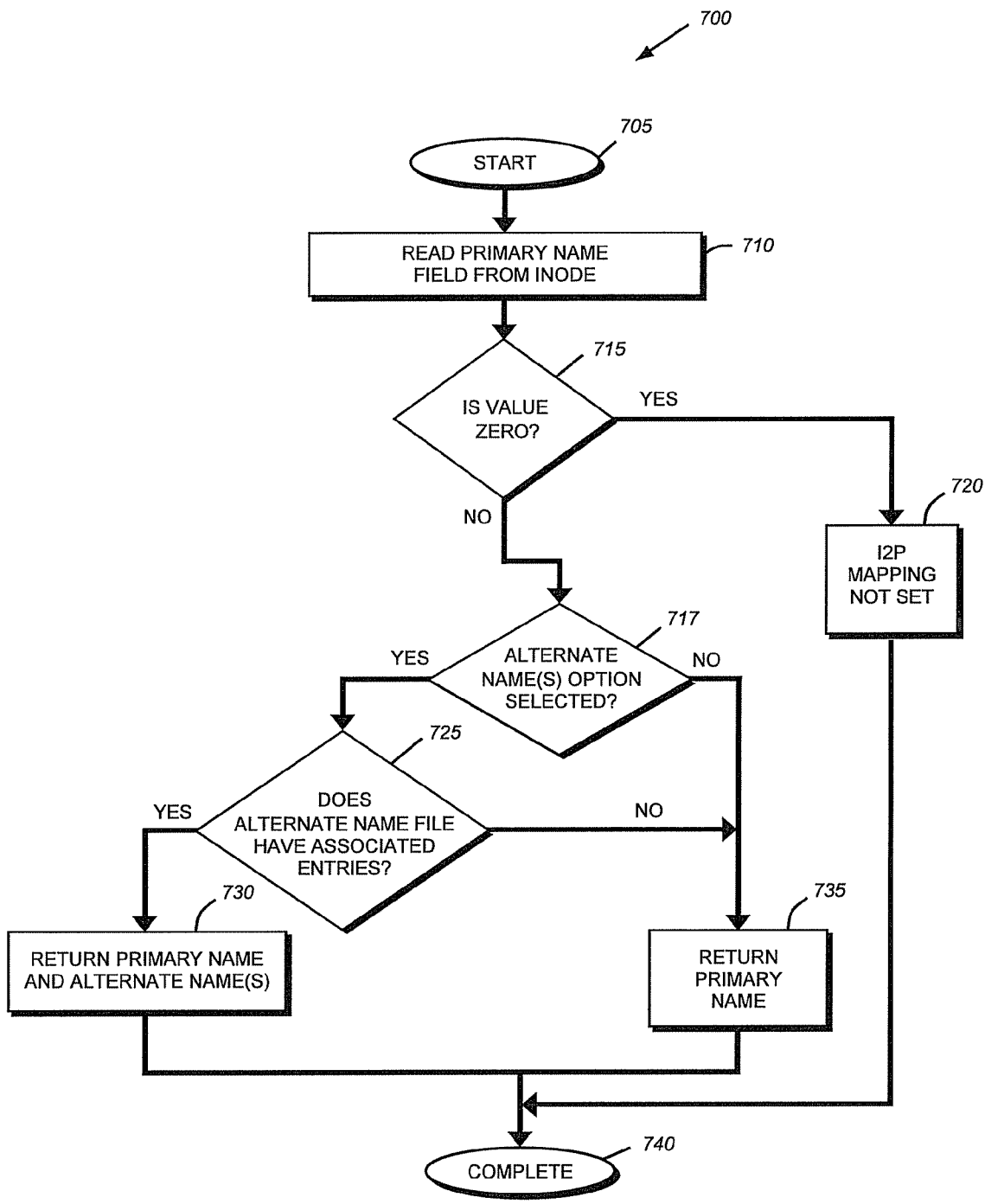
FIG. 7 is a flowchart detailing the steps of a procedure for retrieving inode to pathname mapping information in accordance with an embodiment of the present invention.

FIG. 7 is a flowchart detailing the steps of a procedure 700 for retrieving I2P information in accordance with an embodiment of the present invention. This procedure may be invoked by an administrator or user entering a command to retrieve the I2P information in response to, e.g., a message reporting an error condition with respect to a particular inode number. An exemplary CLI command for retrieving I2P mapping information, which may be implemented by the UI 275, is:

inodepath -v <volume> [-a] [-s<PCPIname>] <inodenumber> where the -v option identifies the volume name identified in the <volume> field in which the inode number identified in the <inodenumber> field is located. Illustratively, the -a option causes the command to print all of the names associated with the inode, i.e., the primary name and all alternate names associated with the inode. In an exemplary embodiment the program defaults to only displaying the primary name. The -s option causes the program to display the name(s) associated with the inode number <inodenumber> located within the PCPI having the name <PCPIname>. Thus, the program may display names associated with previous point-in-time images of the file system. In the illustrative embodiment the CLI command utilizes the I2P functions 284 of the storage operating system 200 to retrieve and display the information to the administrator.

The procedure 700 begins in step 705 and continues to step 710 where the file system and I2P functions retrieve (read) the primary name data structure from the inode. In step 715, the file system and I2P functions determine whether the primary name data structure contains a zero value. Illustratively, a zero value within the primary name data structure signifies that the file system has not yet identified the appropriate I2P mapping information for this inode. This may be because an initial scan, described further below, has not yet reached this particular inode or may be due to corruption of the information which has resulted in the file system clearing the I2P information to prevent incorrect results being returned. If the primary name data structure within the inode contains a zero value, the procedure branches to step 720 signifying that the I2P mapping information is not set before completing in step 740. Illustratively, a caller or program invoking procedure 700 will return to the user information signifying that the I2P mapping information is not available. In alternate embodiments, if the primary name data structure is zero, then the file system invokes the scanner, described further below, to generate the appropriate information. In such alternative embodiments the scanner, which is part of the I2P functions 284, generates the appropriate primary name data structure contents before reinitiating procedure 700.

If, in step 715, the value is not zero then the procedure continues to step 717 where a determination is made whether the option, e.g., -a, has been selected to display alternate names. If the alternate names option has not been set, the procedure branches to step 735 and returns the primary name before completing in step 740.

However, if in step 717 it is determined that the administrator desires to display alternate names, the procedure continues to step 725 where a determination is made as to whether the alternate name file contains entries associated with this inode. If the alternate names file does not contain any associated entries, then the data container only has a primary name, which is returned in step 735 before the procedure completes in step 740. The primary name is determined by examining the directory entry in the appropriate directory that is identified by the cookie value within the primary name data structure. However, if in step 725 there are alternate names identified, then the file system returns the primary name and the alternate name(s) in step 730 before completing in step 740. The alternate name(s) are identified in a similar manner to the primary name, i.e., the directory is identified by the parent directory inode and a specific entry within the directory is identified by the cookie value.

Figure 8:
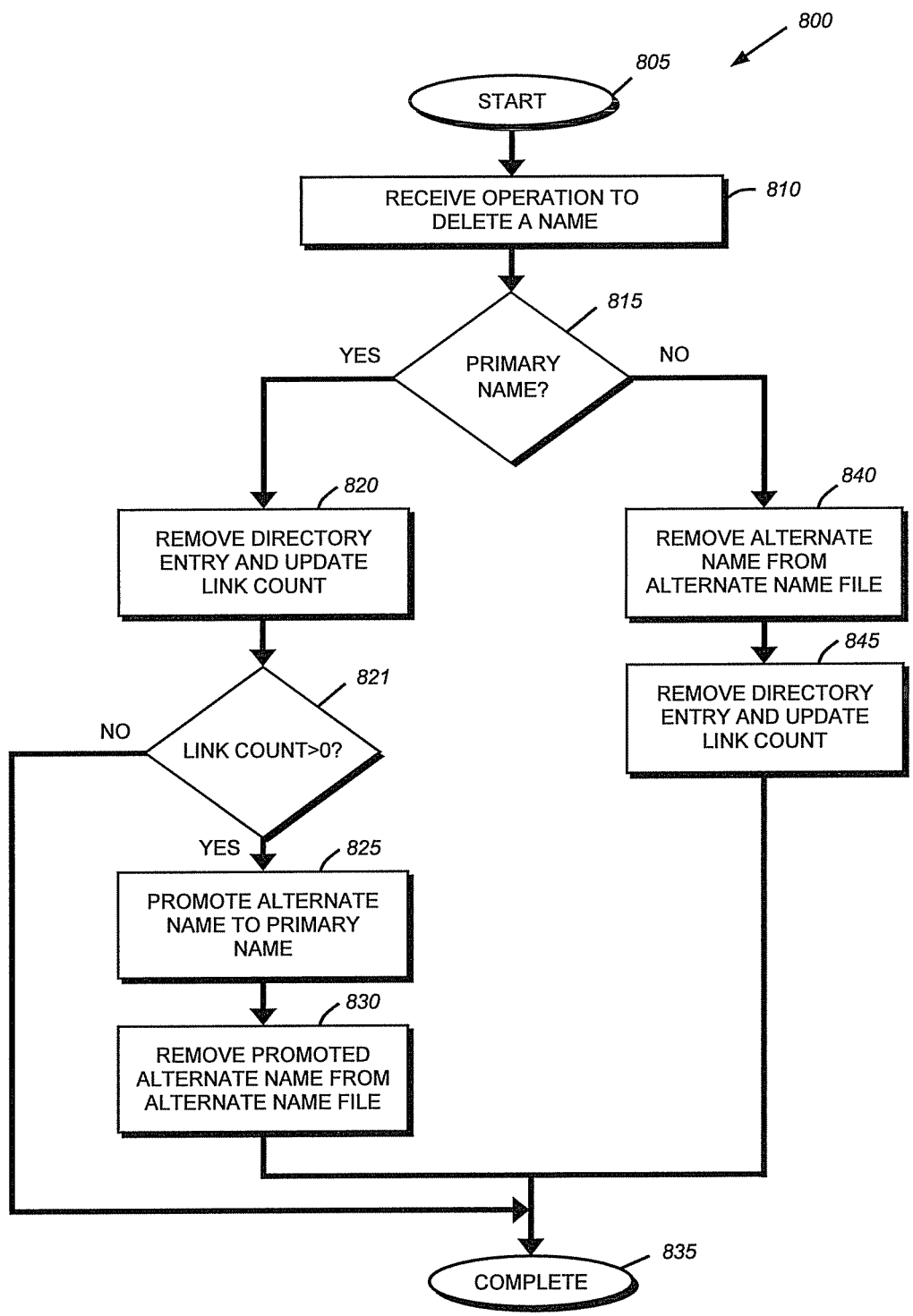
FIG. 8 is a flowchart detailing the steps of a procedure for deleting a name and associated inode to pathname mapping information in accordance with an embodiment of the present invention.

FIG. 8 is a flowchart detailing the steps of a procedure 800 for deleting a name in accordance with an embodiment of the present invention. The procedure 800 begins in step 805 and continues to step 810 where an operation to delete a name is received by the file system. The file system, in conjunction with I2P functions 284, perform procedure 800 to remove the name and to ensure that I2P mapping information remains up to date. A determination is made in step 815 whether the name to be deleted is the primary name associated with the inode, i.e., the name stored in the primary name data structure within the inode. If the name to be deleted is the primary name, the procedure branches to step 820 where the file system and I2P functions remove the appropriate directory entry and update the link count of the inode.

Once the directory entry has been removed and the link count updated, the procedure determines, in step 821, whether the link count is greater than zero for the inode. If the link count is not greater than zero, then the procedure branches to step 835 and completes. An inode will have a link count when the one and only name associated with it is removed, thereby indicating that the data container associated with the inode may be removed from the file system.

In step 825, an alternate name of the data container is "promoted" to the primary name. Illustratively, the first alternate name stored in the alternate name file is selected and stored within the primary name data structure of the inode as the new primary name. Once the newly promoted primary name has been stored, the file system and I2P functions remove the promoted alternate name from the alternate name file in step 830 before the procedure completes in step 835. However, if in step 815, it is determined that the name to be deleted is not the primary name, the procedure branches to step 840 where the name is removed from the alternate name file. This may be accomplished using conventional B+ tree removal operations. In alternate embodiments, where the alternate name file is not implemented as a B+ tree, appropriate conventional entry removal operations are utilized. In step 845, the appropriate directory entry is removed and the link count of the inode is updated before the procedure completes in step 835.

F. File System and I2P Verification

The present invention provides a system and method for verifying and restoring the consistency of inode to pathname mappings from a data container to its parent directory within a file system of a storage system. In a first embodiment, an off-line volume verification tool is modified to, inter alia, verify the consistency of I2P information within the file system. Any primary name data structures that are identified as inconsistent are repaired so that each data structure contains the appropriate information representative of the primary name for the data container such as a file. The alternate name file is verified and if inconsistencies are noted therein, the alternate name file is deleted and an I2P name mapping scanner is invoked to reconstruct the alternate name file.

In a second embodiment of the invention, an on-line file system verification tool is modified to verify the consistency of the I2P information within the file system. The on-line verification tool illustratively modifies function calls e.g., (LoadInode( )) and buffer trees (LoadBuffer( )) within the storage operating system that load inodes and contents of buffer trees. Before an inode or buffer tree is returned to a process that called the loading function, the verification tool performs a check on the inode and related buffer trees. Illustratively, this check includes, inter alia, verifying and repairing the consistency of the I2P information associated with the inode. In the second illustrative embodiment, a background process is created that sequentially loads inodes so that all inodes of the file system are checked, even if another process or application does not request a particular inode.

Off-Line Verification

Figure 9:
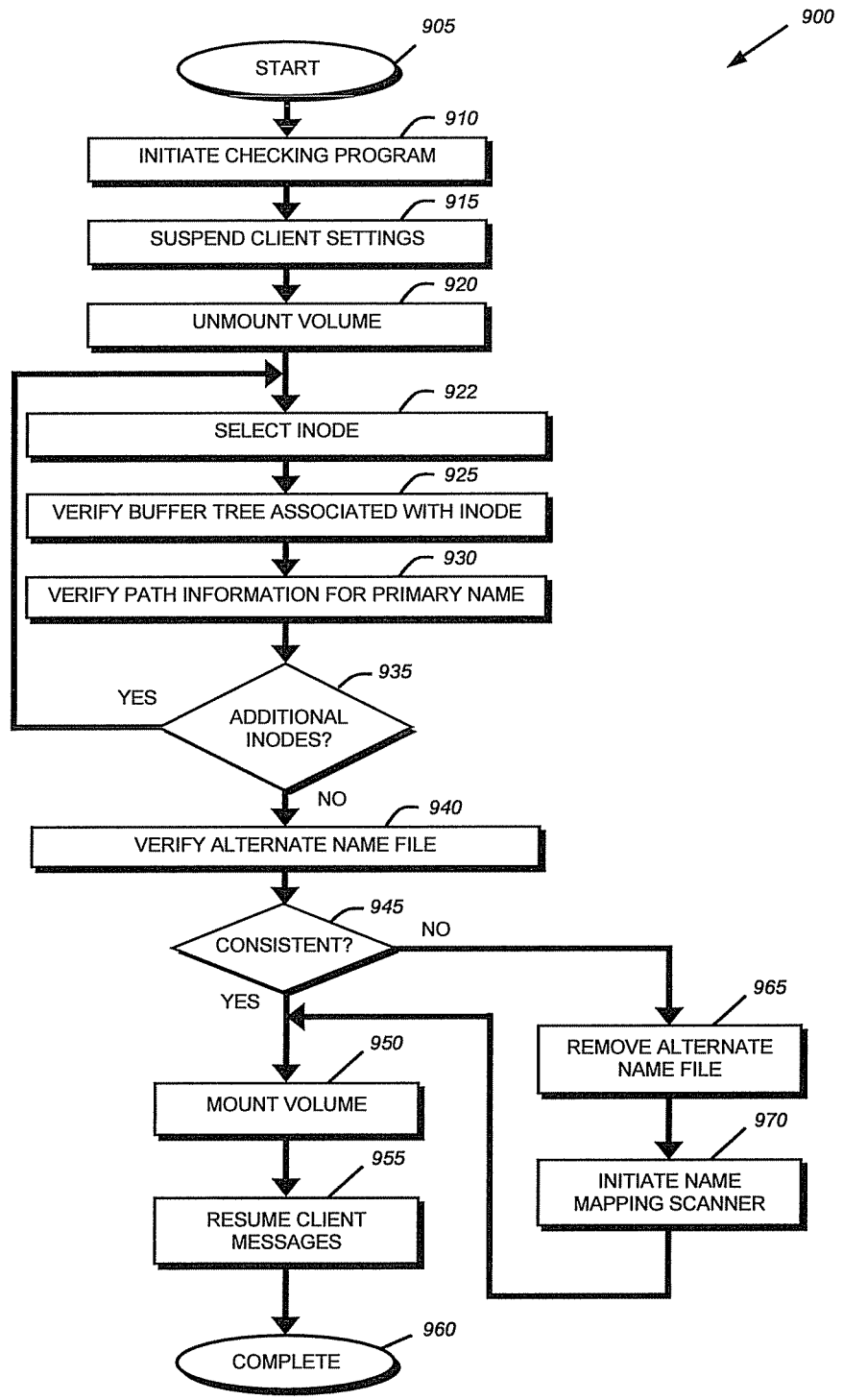
FIG. 9 is a flowchart detailing the steps of a procedure for performing an off-line verification of inode to pathname mapping information in accordance with an embodiment of the present invention.

FIG. 9 is a flowchart detailing the steps of a procedure 900 for performing an off-line verification of a file system including I2P mapping information in accordance with an embodiment of the present invention. The procedure 900 begins in step 905 and continues to step 910 where the appropriate checking program is initiated. This may be performed by an administrator utilizing the user interface to invoke the off-line verification procedure (which is illustratively part of checking processes 283) or may be caused by the happening of a predetermined event, such as an error condition. Upon initiation, the verification procedure suspends client messages in step 915. Notably, any previously received client messages, such as data access operations are processed; however, any later received messages are not processed. Depending on the protocol utilized to access the volume, an error message may be returned and/or a timeout may occur. Once client messages have been suspended and any received messages processed, the verification procedure unmounts the volume in step 920. This may be performed using conventional file system processes. Typically, unmounting the volume causes the file system to flush any in-memory caches so that the volume is in a consistent state.

In step 922, the verification procedure selects an inode from the inode file and, in step 925, verifies the buffer tree associated with the inode. In step 930, the verification procedure then verifies the I2P mapping information for the primary name associated with the selected inode. In step 935, the verification procedure determines whether there are additional inodes to be verified. If so, the verification procedure loops back to step 922 and selects another inode. However, if there are no additional inodes to be scanned, the verification procedure continues to step 940 where it verifies the alternate name file. Verification of the alternate name file includes, inter alia, ensuring that an appropriate entry appears in the alternate name file for each alternate name identified while scanning the inode file. Similarly, such verification may include ensuring that there are no extraneous and/or duplicate entries within the alternate name file. In step 945, a determination is made whether the alternate name file is fully consistent. If so, the verification procedure continues to step 950 and mounts the volume before resuming client messages in step 955. The procedure then completes in step 960.

However, if the alternate name file is not consistent, then the verification procedure branches to step 965 and removes the alternate name file. Once the alternate name file has been removed, the verification procedure then initiates a name mapping scanner to reconstruct the I2P alternate name file. Such a name mapping scanner is further described in the above-incorporated U.S. Pat. No. 7,739,318. The name mapping scanner proceeds independently of the verification procedure to populate the alternate name file. The procedure continues to step 950 where the verification procedure mounts the volume before resuming the processing of client messages in step 955. The procedure then completes in step 960.

On-Line Verification

Figure 10:
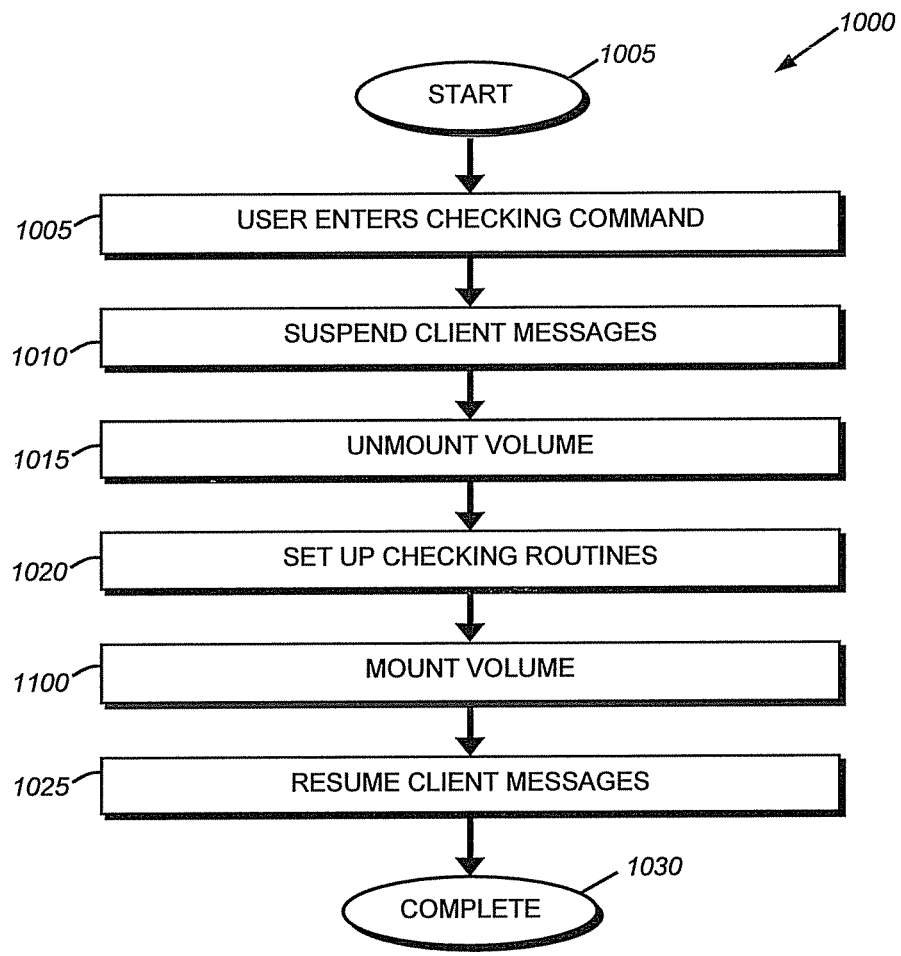
FIG. 10 is a flowchart detailing the steps of a procedure for performing an on-line verification of inode to pathname mapping information in accordance with an embodiment of the present invention.

In a second embodiment of the present invention, an on-line check of the file system modifies the LoadInode( ) and LoadBuffer( ) functions of the storage operating system so that upon the retrieval of an inode and/or buffer tree, a series of verification checks are performed. The initialization procedure 1000 of the illustrative on-line file system checking process is shown in FIG. 10. In step 1005, an administrator enters an on-line checking command via a command line interface (CLI) or via a graphical user interface (GUI) or via any other input methodology. In alternate embodiments, the storage operating system can be configured so that the file system check automatically initiates upon a set event, for example, a crash or other error condition. Upon entry of the checking command, the file system suspends client messages in step 1010. Suspension of client messages means that the file system will accept file system commands including, for example, data write and/or read commands. However, while the client messages are suspended, the file system will not act upon these commands. To the process or client initiating the file system command, it appears that there is a delay in the execution of the command.

In step 1015, the volume to be checked is unmounted. In the illustrative embodiment, the unmounting of a volume causes any in-core cached information to be flushed to the physical disks of the volume, thereby placing these disks in a consistent state. In step 1020, the checking routines are initialized. In the illustrative embodiment, the file system includes a function that retrieves an inode (LoadInode( ) 285) for further processing. To perform on-line checking, the checking processes modify this LoadInode( ) 285 function to include a check of the file system structure, e.g., inode or directory, being accessed. The checking process first performs the check of the inode to be retrieved before returning the inode to the process that called the LoadInode( ) function 285. The volume is then remounted as described in procedure 1100. Once the volume is remounted, the file system resumes client messages in step 1025 such that client messages which have either been suspended or which are later received by the file system layer are processed using the modified LoadInode( ) function 285. Thus, any request for an inode will first check that inode and associated buffer trees before returning the inode to the calling process. The procedure 1000 then completes in step 1030.

Figure 11:
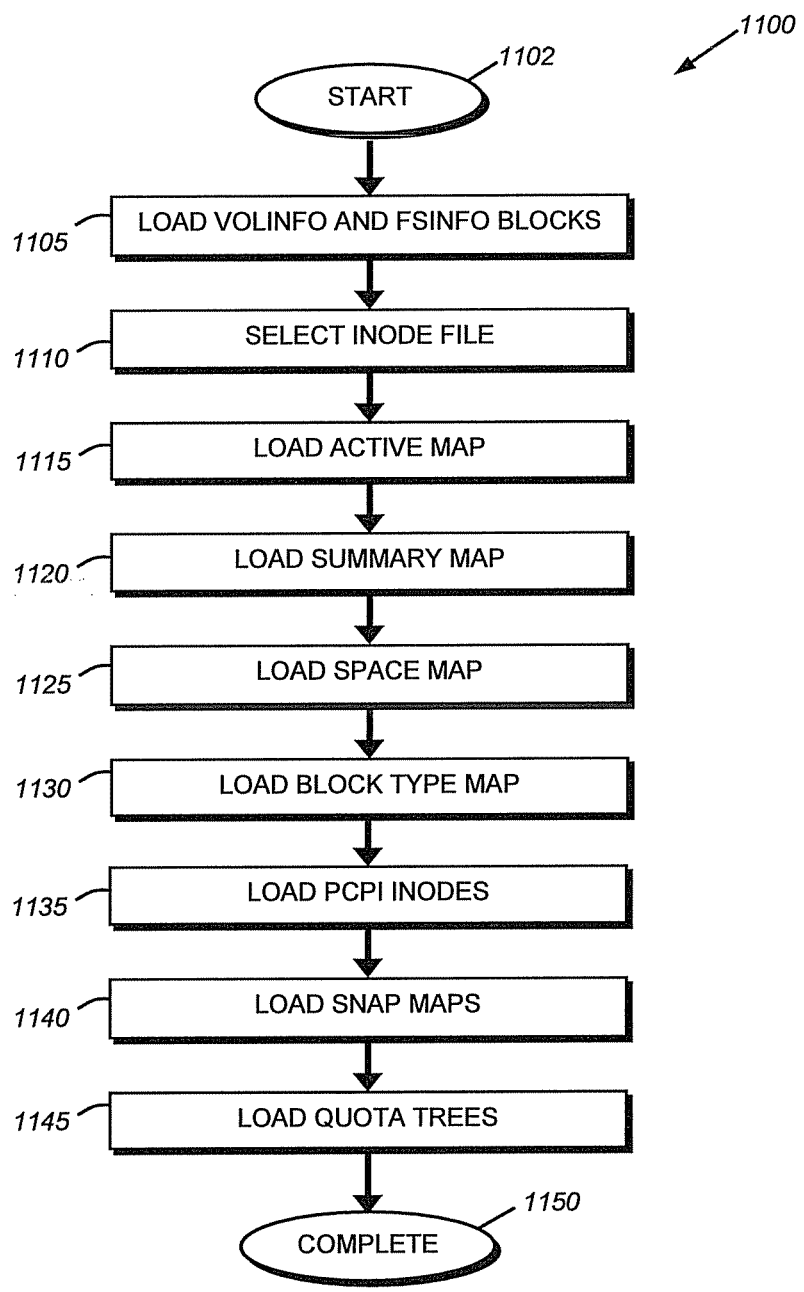
FIG. 11 is a flowchart detailing the steps of a procedure for mounting a volume in accordance with an embodiment of the present invention.

FIG. 11 is a flowchart linking a procedure 1100 performed by the file system when mounting a volume in accordance with a second embodiment of the present invention. The volinfo and fsinfo blocks are first loaded in step 1105. The volinfo and fsinfo blocks, as described above, contain numerous metadata relating to the file system. In step 1110, an inode file is selected. Typically, the inode file associated with the fsinfo is selected. However, in certain configurations, alternate inode files are loaded. In step 1115, the active map is loaded. The active map is a data structure that is utilized by the file system to track which blocks are used by the active file system. It should be noted that during this and other subsequent load operations, the modified LoadInode( ) function 285 is utilized. Thus, during mounting of the volume by the file system, the various inodes and directories associated with the file system files are verified. In step 1120, the summary map is loaded. The summary map stores metadata and when determining which blocks are used by any PCPIs stored by the file system.

In step 1125, the space map is loaded. The space map is a map of the various blocks of the file system indicating which blocks are utilized by the active file system and which are free to be allocated. Step 1130, the block type map is loaded. The block type map identifies the use of a block. For example, a block could be used as a data holding block, or as a directory block. Next, the PCPI inodes are loaded in step 1135 and the snap maps are loaded in step 1140. In step 1145, the quota trees are loaded. A quota tree (or qtree) is a subset of a volume that is defined by a directory. A quota specifies the maximum amount of storage resources available to a qtree. Thus, if it is desired to limit storage for a project having many users, it is appropriate to specify a quota on a qtree instead of an actual security object. Multiple qtrees can be created on a single volume, with each qtree having a different size (as desired). However, the qtree can also be created without a limit (quota). A qtree is essentially a mini-volume with the property that every object within the qtree has a qtree ID in its inode. This information is scanned and identified by the file system.

As each of these file system metadata files is loaded using the modified LoadInode( ) function 285, each file also is checked in accordance with the teachings of this invention. Thus, by the completion of a volume mount operation, the above-mentioned file system metadata files have been checked. Note that some files, such as the inode file, which contain a large quantity of data may be only selectively checked so as to reduce processing time and overhead. It should be noted that the above-mentioned metadata files are illustrative and that in alternate embodiments of the present invention additional and/or differing metadata files may be checked.

Figure 12:
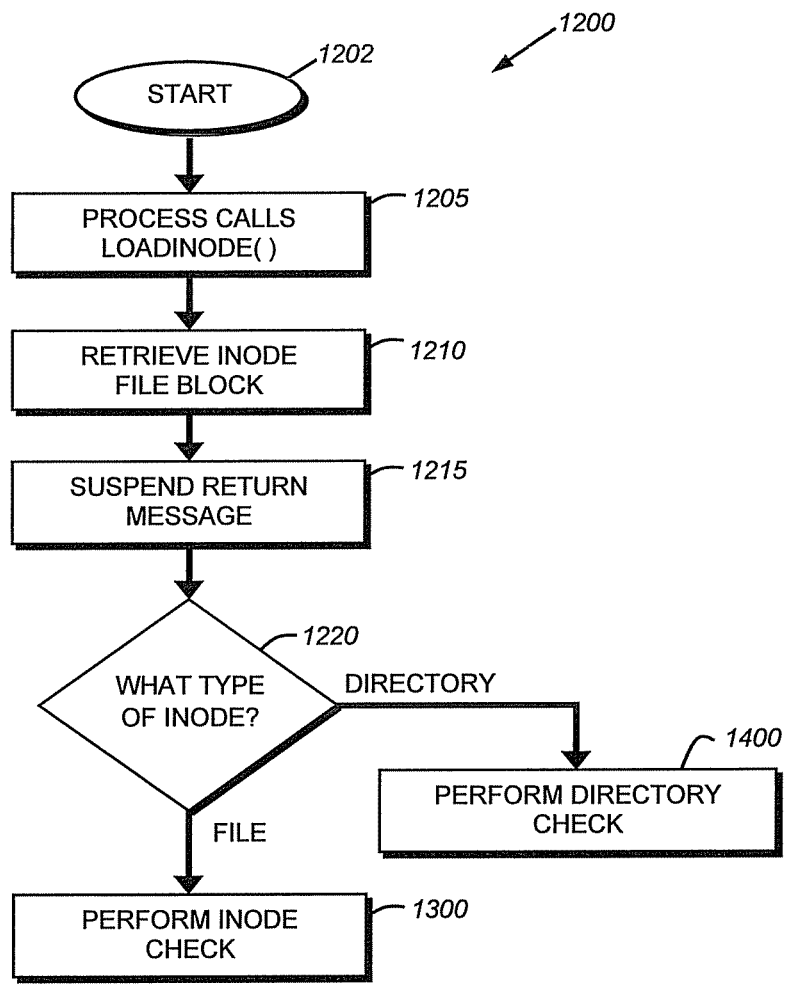
FIG. 12 is a flowchart detailing the steps of a procedure for loading an inode while performing an on-line verification of inode to pathname mapping information in accordance with an embodiment of the present invention.

FIG. 12 is a flowchart illustrating a procedure 1200 performed by the verification processes when performing an on-line check in a file system. In step 1205, a process within the storage operating system calls the LoadInode( ) function 285. As the LoadInode ( ) function has been modified, the traditional LoadInode( ) functionality has been supplemented by the procedure described herein. The inode file block requested with the LoadInode( ) command is then retrieved (step 1210). The inode file block could be in-core if it has been recently utilized, or may be physically located on disk. If the inode file block is on disk, then the file system retrieves the data block from disk by sending the appropriate commands to the RAID and disk driver layers of the storage operating system. In step 1215, the return message to the process that called the LoadInode( ) function is suspended. Suspension of the return message lasts for the duration of the check of this particular inode. Thus, to the process calling the LoadInode( ) command, it appears that a request has incurred some latency. This enables on-line checking of the file system with minimal disruption of service. Although requests for inodes are delayed while the inodes are checked, the file system, as a whole, remains on-line and available for use. By "on-line" it is meant that the file system is accessible by users for read and/or write functions.

In step 1220, the file system checking routine determines the type of inode that has been requested. If the inode requested is a file inode, then the checking process performs an inode check as described in procedure 1300. However, if the inode requested is a directory inode, then the checking process performs a directory check as described in procedure 1400.

Figure 13:
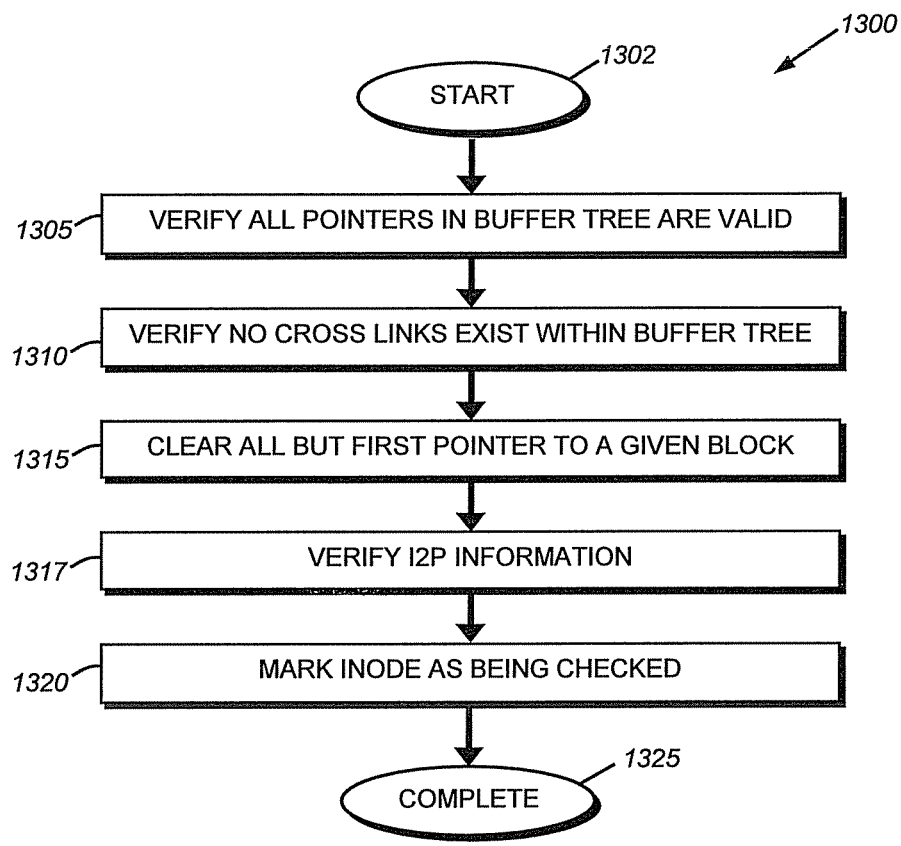
FIG. 13 is a flowchart detailing the steps of a procedure for checking an inode in accordance with an embodiment of the present invention.

To check an inode, the buffer trees associated with the inode are verified in accordance with procedure 1300 shown in FIG. 13. This procedure operates by traversing the various branches of the buffer tree and verifying certain key items. In step 1305, the inode check verifies that all pointers in the buffer tree are valid. If a pointer is directed to an invalid block, the pointer is cleared. In step 1310, the inode checking process verifies that no cross-links exist within a buffer tree. If a block has multiple pointers to it, the inode checking process clears all but the first pointer (step 1315). Thus, the first block to point to a given block is retained with any other blocks having their pointers removed. In step 1317 the I2P information for the inode is verified. This illustratively includes, e.g., verifying that the primary name data structure is consistent with the file system. The I2P information is verified by, for example, reading the primary name data structure associated with the inode using, e.g., procedure 700. The retrieved primary name is then compared to the file system to ensure that it is consistent, i.e. both the file system and the primary name data structure identify the same name for the data container. If the I2P information is inconsistent, the process corrects the primary name data structure. Finally, the inode is marked as being checked (step 1320). Such marking can be accomplished by modifying a tracking file, described further below, or by modifying a bit within the inode's metadata.

Figure 14:
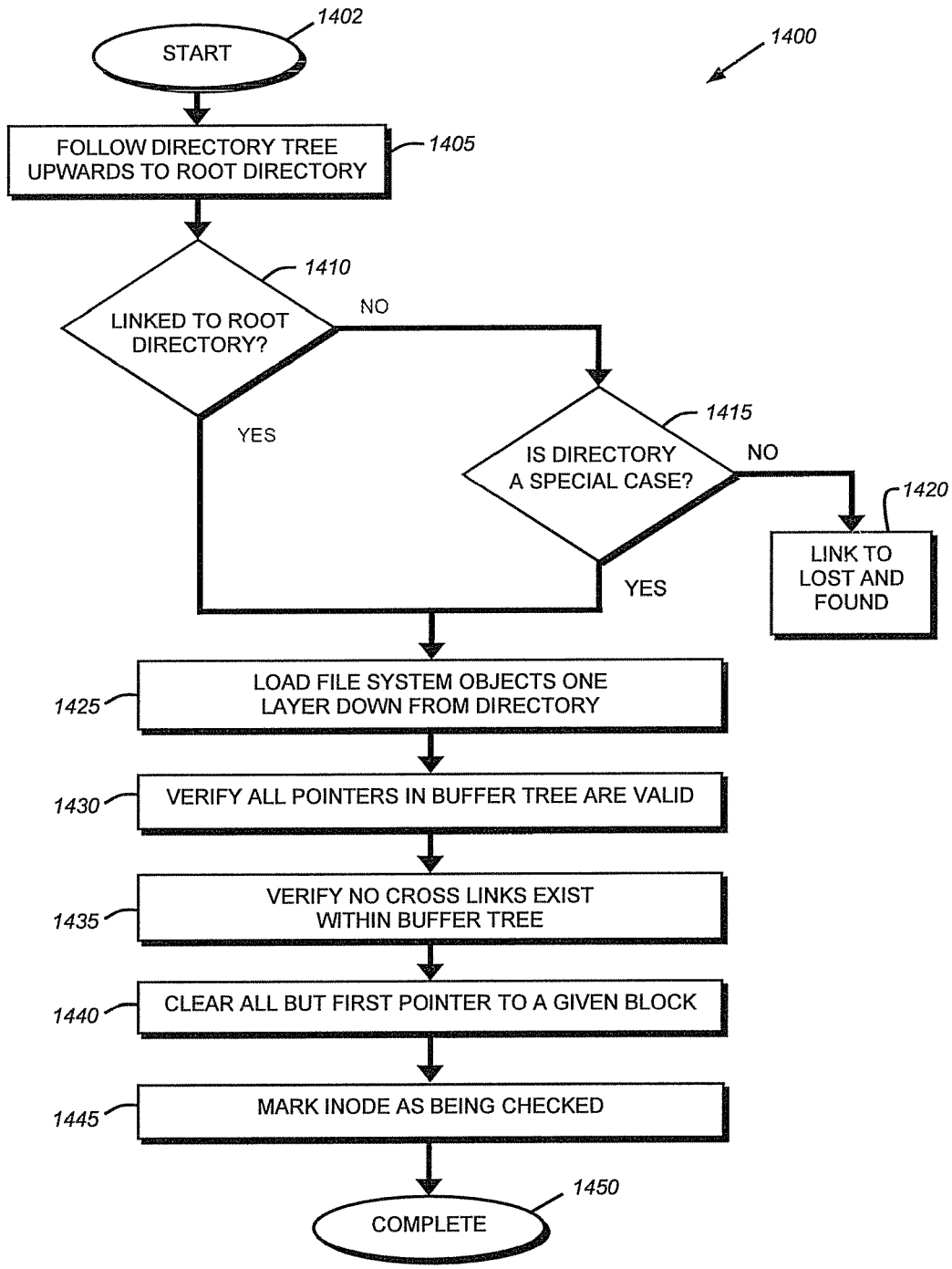
FIG. 14 is a flowchart detailing the steps of a procedure for verifying a directory in accordance with an embodiment of the present invention.

FIG. 14 is a flowchart illustrating the procedure 1400 performed by the verification process when checking a directory. The checking process follows the directory tree upwards to the root directory. For example, if the sub directory of the path "/dir1/dir2/sub" is being checked, the checking process first moves to the dir2 directory and then to the dir1 directory before finding the root directory. Traversal of the directory tree can be accomplished by, for example, accessing a special entry in a directory that identifies the directory's parent directory. In one embodiment, this special entry is denoted ".." (dot-dot) within a directory.

After the directory tree has been traversed upwards as far as possible, the process determines if the directory is linked to the root directory of the volume (step 1410). If the directory is not linked to the root directory, the process determines if the directory is a special directory that should not be linked to the root directory in step 1415. An example of such a special directory is a metadirectory storing file system metadata. Metadirectories are further described in U.S. Pat. No. 7,386,546, issued on Jun. 10, 2008, entitled METADATA DIRECTORY FILE SYSTEM, by Douglas Santry, et al. If the directory is not a special case, then the directory is linked to a lost and found directory (step 1420) for later processing. The lost and found directory can be accessed by a user or administrator of the storage system to determine what further actions should be taken with respect to these directories.

If the directory does link to the root directory or if the directory is a special case that does not need to link to the root directory, the checking process then loads the file system objects that are one level beneath the directory (step 1425). These file system objects include, for example, subdirectories of the selected directory or files stored in the selected directory. Additionally, each directory entry is loaded to obtain a list of names that are utilized to verify the alternate name file.

Next, the checking process performs the above-described buffer tree checks of the buffer trees associated with the directory. In step 1430, the process verifies that all pointers within the buffer tree are valid. If there are invalid pointers, i.e. a pointer points to an invalid inode or file data block, the pointer is cleared. In step 1435, the process checks that no cross links exist within the buffer tree. If multiple blocks point to a given block, then all but the first pointer is removed in step 1440. Finally, in step 1445, the directory is marked has having been checked. Such marking can be accomplished by the use of a tracking file, described further below.

Figure 15:
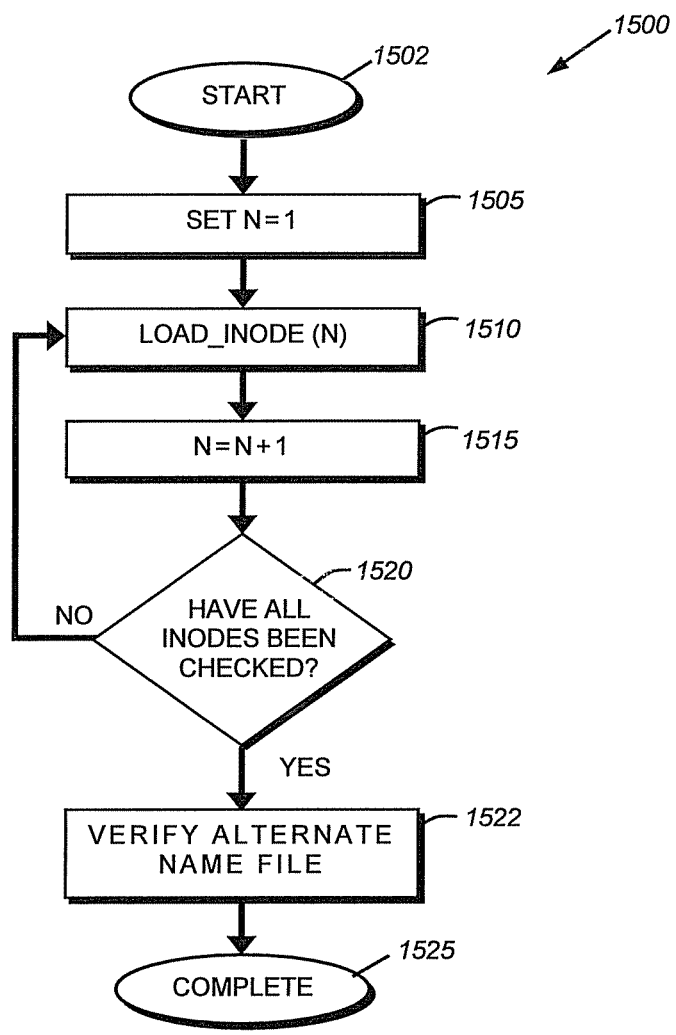
FIG. 15 is a flowchart detailing the steps of a procedure executed by a scanner to ensure that all inodes are verified in an on-line check of a file system in accordance with an embodiment of the present invention.

To ensure that all inodes of the file system are checked in a timely manner, a background process (not shown) is initiated by the file system checking process. By "background process" it is meant generally a process executing at a low priority within the storage operating system that performs a given function with no user input. The procedure performed by this background process is shown in FIG. 15. A counter (N) is initially set to a value of one (step 1505). The background process then calls the LoadInode( ) function requesting the Nth inode, i.e. LoadInode(N). The LoadInode( ) function has been modified to incorporate checking and as such, the requested inode is checked. Next, the counter is increased by one (step 1515). The background process determines whether all inodes in the file system have been checked in step 1520 by, e.g., utilizing the file system tracking files, described below. If all inodes have been checked, the process then verifies the alternate name file in step 1522. If an entry is missing, the process adds the entry. If an entry should not exist, i.e., there is no corresponding name in the file system, the superfluous entry is removed. The checking process ensures that the alternate name file is consistent with the file system. If the alternate name file is severely corrupted, the checking process may remove the alternate name file and initiate an I2P scanner to repopulate the alternate name file.

In the illustrative embodiment, the file system checking process creates a file within the file system being checked. This file stores information relating to those inodes, buffer trees and directories that have been checked by the file system process. By storing the status within a file on the active file system, memory is saved. This file may also be utilized to store alternate names for later verification with the alternate name file.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Accordingly this description is to be taken only by way of example and not to otherwise the scope of the invention. Therefore, it is the object of the appended claims to cover all such variations and modifications as come within the true spirit and scope of the invention.

What is claimed is:

1. A method for verifying consistency of inode to pathname information of a storage system, the method comprising:
requesting, by a process executed by a processor of the storage system, an inode associated with a data container that is serviced by the storage system, the processor further executing a file system;
determining a type of the requested inode;
in response to determining that the type of the requested inode is a file inode,
performing verification by (i) comparing a first primary name maintained within a primary name data structure of the file inode with a second primary name maintained by the file system, and (ii) repairing the first primary name within the primary name data structure of the file inode to be consistent with the second primary name maintained by the file system when the first primary name and second primary name do not match;
in response to determining that the type of the requested inode is a directory inode, performing the verification by removing all invalid pointers within buffer trees associated with the directory inode and removing all cross links within the buffer trees associated with the directory inode; and
returning the requested inode to the process upon completion of the verification.

2. The method of claim 1 further comprising:
promoting at least one alternate name stored in an alternate name data container to the primary name data structure within the requested inode when the primary name has been deleted.

3. The method of claim 2 further comprising:
using a parent directory inode field and a parent directory cookie field associated with the primary name data structure.

4. The method of claim 1 further comprising:
in response to detecting one or more inconsistencies in an alternate name data container configured to maintain alternate names, deleting the alternate name data container; and
invoking an inode-to-pathname scanner to reconstruct the alternate name data container.

5. The method of claim 1 further comprising:
configuring an alternate name data container to store alternate names as a file in a hidden directory of a volume of the storage system.

6. The method of claim 1 further comprising:
receiving one or more access requests, via a network adaptor of the storage system, directed to the requested inode;
in response to receiving the one or more access requests directed to the requested inode, suspending the one or more access requests; and
unmounting a volume of the storage system, the volume associated with the requested inode.

7. The method of claim 6 further comprising:
mounting the volume after performing the verification; and
resuming the one or more access requests directed to the requested inode.

8. The method of claim 1 further comprising:
performing the verification using an off-line procedure.

9. A system configured to perform a verification check of a storage system, comprising:
a processor of the storage system configured to execute a process to request an inode associated with a data container serviced by the storage system executing a file system;
a checking process for execution by the processor configured to:
determine a type of the requested inode,
in response to determining that the type of the requested inode is a file inode, perform verification by (i) comparing a first primary name maintained within a primary name data structure of the file inode with a second primary name maintained by the file system, and (ii) repairing the first primary name within the primary name data structure of the file inode to be consistent with the second primary name maintained by the file system when the first primary name and second primary name do not match,
in response to determining that the type of the requested inode is a directory inode, perform the verification by removing all invalid pointers within the buffer trees associated with the directory inode and removing all cross links within the buffer trees associated with the directory inode; and
a storage operating system of the storage system for execution by the processor configured to return the requested inode to the process upon the verification.

10. The system of claim 9 wherein the primary name data structure comprises a parent directory inode field and a parent directory cookie field.

11. The system of claim 9 wherein the checking process is further configured to verify alternate names by removing duplicate or erroneous alternate names within an alternate name data structure, and initiate a name mapping scanner to reconstruct the alternate name data structure.

12. The system of claim 9 wherein an alternate name data structure is stored in a hidden directory of the volume of the storage system.

13. The system of claim 9 wherein the storage operating system is further configured to suspend one or more client messages directed to the data container, and further configured to unmount a volume of the storage system, wherein the volume is associated with the requested inode.

14. The system of claim 13 wherein the storage operating system is further configured to mount the volume after the verification, and further configured to resume the one or more client messages directed to the data container.

15. The system of claim 9 wherein the requested inode comprises a directory.

16. The system of claim 9 wherein the requested inode comprises a file.

17. The system of claim 9 wherein the checking process comprises an off-line procedure.

18. A non-transitory computer readable media containing executable program instructions executed by a processor, comprising:

program instructions that request an inode associated with a data container that is serviced by a storage system executing a file system;

program instructions that determine that a type of the requested inode is a file inode or a directory inode;

program instructions that perform verification by (i) comparing a first primary name maintained within a primary name data structure of the file inode with a second primary name maintained by the file system, and (ii) repairing the first primary name within the primary name data structure of the file inode to be consistent with the second primary name maintained by the file system when the first primary name and second primary name do not match in response to determining the type of the requested inode is the file inode; and program instructions that perform the verification by removing all invalid pointers within buffer trees associated with the directory inode and removing all cross links within the buffer trees associated with the directory inode in response to determining that the type of the requested inode is a directory inode.

19. An apparatus for performing a verification check of a storage system, comprising:

means for requesting an inode associated with a data container that is serviced by the storage system executing a file system;

means for determining that a type of the requested inode is a file inode or a directory inode;

means for performing verification by (i) comparing a first primary name maintained within a primary name data structure of the file inode with a second primary name maintained by the file system, and (ii) repairing the first primary name within the primary name data structure of the file inode to be consistent with the second primary name maintained by the file system when the first primary name and second primary name do not match in response to determining the type of the requested inode is a file inode; and means for perform the verification by removing all invalid pointers within buffer trees associated with the directory inode and removing all cross links within the buffer trees associated with the directory inode in response to determining that the type of the requested inode is a directory inode.

* * * * *